(12) United States Patent
Kamizuma et al.

(10) Patent No.: US 8,922,263 B2
(45) Date of Patent: Dec. 30, 2014

(54) SEMICONDUCTOR INTEGRATED CIRCUIT AND CIRCUIT OPERATION METHOD

(75) Inventors: Hiroshi Kamizuma, Tachikawa (JP); Taizo Yamawaki, Tokyo (JP); Yukinori Akamine, Kokubunji (JP); Koji Maeda, Kodaira (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1539 days.

(21) Appl. No.: 12/541,358

(22) Filed: Aug. 14, 2009

(65) Prior Publication Data

US 2010/0052743 A1    Mar. 4, 2010

(30) Foreign Application Priority Data

Aug. 29, 2008    (JP) ................ 2008-220650

(51) Int. Cl.
| | |
|---|---|
| G11C 5/14 | (2006.01) |
| H03K 19/003 | (2006.01) |
| H03K 17/16 | (2006.01) |
| H03K 19/0175 | (2006.01) |
| H03K 19/094 | (2006.01) |
| H03L 7/00 | (2006.01) |
| H03K 3/00 | (2006.01) |
| G06F 13/42 | (2006.01) |
| H04W 52/02 | (2009.01) |

(52) U.S. Cl.
CPC ........ *G06F 13/4243* (2013.01); *Y02B 60/1228* (2013.01); *H04W 52/0274* (2013.01); *Y02B 60/1235* (2013.01)
USPC ............ 327/144; 327/142; 327/205; 326/33; 326/83; 365/229

(58) Field of Classification Search
USPC ............... 327/142–144, 205; 326/21, 30–34, 326/80–83
See application file for complete search history.

(56) References Cited

U.S. PATENT DOCUMENTS

| | | | | |
|---|---|---|---|---|
| 6,100,814 A | * | 8/2000 | Doyle | 340/12.5 |
| 6,489,803 B1 | * | 12/2002 | Steiner et al. | 326/31 |
| 6,861,886 B1 | * | 3/2005 | Ludden et al. | 327/156 |
| 8,019,316 B2 | * | 9/2011 | Huston et al. | 455/343.1 |
| 8,085,880 B2 | * | 12/2011 | Farjad-Rad | 375/332 |

FOREIGN PATENT DOCUMENTS

JP    H11-017581    1/1999

OTHER PUBLICATIONS

Office Action issued Mar. 28, 2013, in Japanese Patent Application No. 2008-220650.

(Continued)

*Primary Examiner* — Lincoln Donovan
*Assistant Examiner* — Colleen O Toole
(74) *Attorney, Agent, or Firm* — Miles & Stockbridge P.C.

(57) ABSTRACT

The power consumption of a data sampling unit that selects a phase of a clock signal appropriate for sampling payload data is reduced at an input interface. A semiconductor integrated circuit includes an input interface and internal core circuits. The input interface includes a hysteresis circuit and a data sampling unit. The hysteresis circuit detects an input signal between first and second input thresholds as a sleep command. The data sampling unit selects an appropriate phase of a sampling clock signal in accordance with a synchronizing signal and samples payload data. When a sleep command is detected, a sleep signal is also supplied to the internal core circuits and the data sampling unit and they are controlled into a low-power consumption state.

12 Claims, 15 Drawing Sheets

(56) References Cited

OTHER PUBLICATIONS

K. Chabrak et al, "Design of a High Speed Digital Interface for Multi-Standard Mobile Transceiver RFIC's in 0.13 μm CMOS", 2005 The European Conference on Wireless Technology, pp. 217-220, Oct. 3-4, 2005.

Wikipedia, "Schmitt trigger," available online at http://en.wikipedia.org/wiki/Schmitt_trigger, last modified Dec. 3, 2013, pp. 1-11.

Lammert Bies, "Schmitt-trigger circuit tutorial," available online at http://www.lammertbies.nl/comm/info/Schmitt-triguer.html 1997-2010, pp. 1-4.

* cited by examiner

US 8,922,263 B2

SEMICONDUCTOR INTEGRATED CIRCUIT AND CIRCUIT OPERATION METHOD

CLAIM OF PRIORITY

The present application claims priority from Japanese application JP 2008-220650 filed on Aug. 29, 2008, the content of which is hereby incorporated by reference into this application.

FIELD OF THE INVENTION

The present invention relates to semiconductor integrated circuits having an input interface supplied with input signals from an internal core circuit and an external source and operation methods therefor and in particular to a technology effective to reduce the power consumption of a data sampling unit that selects a phase of a sampling clock signal appropriate to sample externally supplied payload data.

BACKGROUND OF THE INVENTION

With respect to recent cellular phone units, attention has been given to a digital interface between BBLSI (Base Band Large Scale Integrated circuit, also referred to as baseband IC) and RFIC (Radio Frequency Integrated Circuit).

The standard DigRF v3, one of standards for digital serial interface between BBLSI and RFIC, is standardized by a group called DigRF Working Group in an organization named as MIPI (Mobile Industry Processor Interface Alliance). This standard is for such applications as GSM, EDGE, WCDMA, and the like. GSM is an abbreviation for Global System for Mobile Communication; EDGE is an abbreviation for Enhanced Data for GSM Evolution or Enhanced Data for GPRS; and WCDMA is an abbreviation for Wideband Code Division Multiple Access.

According to the standard DigRF v3, RFIC and BBLSI convert the differential analog signals of their respective interfaces into single ended digital signals. Interfaces for transmit data and reception data reduce electricity consumption and unwanted emission by a low-swing controlled-impedance differential pair and provide reliable data transfer at a high data rate. The peak-to-peak differential voltage is 0.9 V and the minimum differential voltage is 100 mV. The line driver and the line receiver of interfaces for transmit data and reception data are provided with sleep mode for power saving and brought into sleep mode during an interframe gap longer than a frame period. For transition to sleep mode, a line driver asserts a high level of "1" during a bit period immediately after the last bit of a frame. Thereafter, the line driver shifts to a low-power state in which it is kept at common mode voltage obtained by reducing the difference voltage of the interface to −5 mV to +20 mV. The hysteresis of the line receiver makes sure the display of a high level of "1" to the internal circuit of a receiver IC. To exit from sleep mode, the line driver drives a low level during at least an 8-bit period (for high-speed clock) or a 1-bit period (for low-speed or medium-speed clock) before the start of the initial bit in the synchronization sequence of a new frame.

According to the standard DigRF v3, further, the following is required to generate 312-MHz data clock used in when the reception data interface and the transmit data interface are in high speed mode: a high-speed interface clock generator is required both in RFIC and in the baseband LSI.

According to the standard DigRF v3, furthermore, transmitted transmit data and reception data are divided into multiple frames and each frame contains three fields, synchronization, header, and payload. The synchronization field contains a synchronization pattern of a predetermined 16-bit code "1010100001001011" and is used to allow the receiving side of a link to select a phase of clock appropriate to sample input data. The header field is comprised of eight bits and contains information on size, the logical channel type of each frame, a signal bit having different functions in the direction of transmit data and in the direction of reception data. The payload field is provided with seven different data sizes, 8 bit, 32 bit, 64 bit, 96 bit, 128 bit, 256 bit, and 512 bit.

Non-patent Document 1 listed below describes a high-speed digital interface configured by incorporating an A-D converter and a D-A converter in the RFIC of a cellular phone. Thus a digital signal generated at an RF transceiver chip is transferred to a baseband chip without causing degradation in an RF signal due to EMC (Electromagnetic Emission) or spikes in power supply voltage. This high-speed digital interface is comprised of: a pair of transmission lines; a differential driver for driving the pair of transmission lines; and a differential receiver for detecting the difference voltage of the pair of transmission lines. The differential driver is comprised of a differential push-pull and a current source coupled between this differential push-pull and power supply voltage. The differential receiver is comprised of a passive terminating resistor of 100Ω, a comparator with hysteresis, and a CMOS push-pull driver. This transmission is designated as R-LVDS (Reduced-Low-Voltage-Differential-Signaling) by the authors.

[Non-patent Document 1] K. Chabrak et al, "Design of a High-Speed Low-Power Digital Interface for Multi-Standard Mobile Transceiver RFIC's in 0.13 μm CMOS," 2005 The European Conference on Wireless Technology, 3-4 Oct. 2005, PP. 217-220.

SUMMARY OF THE INVENTION

Prior to the invention, the present inventors were engaged in the research and development of a radio frequency integrated circuit (hereafter, referred to as RFIC) that would support transmission and reception functions in dual mode of WCDMA and EDGE As an input interface unit for this RFIC, a digital interface in compliance with the above-mentioned standard DigRF v3 was adopted. This digital interface utilizes low-amplitude differential signals that enable high-speed data transfer between it and a baseband LSI and sleep mode in which power consumption reduction can be achieved.

The present inventors considered further reduction in the power consumption of the RFIC having the digital interface as described below:

To cause the RFIC to shift to sleep mode for power consumption reduction, the baseband LSI as a line driver is set to common mode voltage obtained by reducing the difference voltage of the digital interface to −5 mV to +20 mV. Therefore, the digital interface of this RFIC is required to detect a common mode voltage set within a voltage range of −5 mV to +20 mV. As is well known, a specific voltage range can be detected by use of a hysteresis circuit having two input thresholds.

According to the above-mentioned standard DigRF v3, meanwhile, to wake up from sleep mode, the line driver outputs a low level during at least an 8-bit period (high-speed clock) or a 1-bit period (low-speed or medium-speed clock). The line driver outputs it before the start of the initial bit in the synchronization sequence of a new frame. The RFIC shifted from sleep mode to active mode is required to receive a 16-bit synchronization field supplied from the baseband LSI. Then it is required to select a phase of clock appropriate to sample received input data from a synchronization pattern of a predetermined 16-bit code. The synchronization pattern of the predetermined 16-bit code is "1010100001001011." A low level for wake-up can also be detected using the above-mentioned hysteresis circuit having two input thresholds. In addition, a synchronous circuit of some kind is required to select an appropriate phase of sampling clock from a synchronization pattern.

The present inventors considered incorporating a data sampling unit for sampling high-speed, low-amplitude differential signals of a digital interface (in compliance with the standard DigRF v3) supplied from the baseband LSI to the RFIC into the following: an LVDS digital interface that detects common mode voltage for transition to sleep mode and receives low-amplitude differential signals. As the result, the following was found: with the LVDS digital interface as an input interface unit for the RFIC, it is possible to detect common mode voltage for transition to sleep mode and low-level voltage for wake-up; and in addition it is possible to select a phase of clock appropriate to sample received input data of a high-speed, low-amplitude differential signal through the reception of a 16-bit synchronization field. LVDS is an abbreviation for a Low-Voltage Differential Signaling in which low-amplitude differential signals can be processed.

A high-speed, low-amplitude differential digital transmit baseband signal of a digital interface supplied from the baseband LSI to the RFIC can be converted into a large-amplitude digital transmit baseband signal. This conversion is carried out by the hysteresis circuit of the LVDS digital interface and the data sampling unit. Thereafter, the large-amplitude digital transmit baseband signal can be converted into an analog transmit baseband signal by a D-A converter for transmission in the RFIC. The analog transmit baseband signal is supplied to a transmission circuit in the internal core circuit portion of the RFIC. At the transmission circuit, the analog transmit baseband signal is converted into an RF transmission signal through direct up conversion by an RF local signal generated at, for example, a transmission voltage control oscillator. The RF transmission signal can be transmitted to a communication base station for cellular phones through an RF power amplifier, a duplexer, an antenna, and the like external to the RFIC.

As mentioned above, the adoption of the hysteresis circuit of the LVDS digital interface, the data sampling unit, and the D-A converter for transmission make is possible to implement the following: the transmission circuit of an internal core circuit of the RFIC can utilize design resources for the internal circuits of RFICs in the past analog interface era without change. That is, when the hysteresis circuit of the LVDS digital interface as an input interface unit for RFIC detects sleep mode, the RFIC can be brought into a low-power consumption state by taking the following measure: the D-A converter for transmission and an internal core circuit of the RFIC are set to sleep mode.

The present inventors further examined the LVDS digital interface as an input interface unit for the RFIC. As a result, the following problem was found:

This is a problem of the power consumption of a data sampling unit for selecting a phase of clock appropriate to sample received input data from a synchronization pattern of a predetermined 16-bit code. More specific description will be given. The following took place as the result of incorporating a data sampling unit into an LVDS digital interface as an input interface unit for RFIC as mentioned above: even when the hysteresis circuit of the LVDS digital interface detected sleep mode, the data sampling unit incorporated into the LVDS digital interface was not set to sleep mode and was kept in active mode in which the power consumption is large.

Especially, it was revealed that a first cause was the large amount of data processed at the data sampling unit for selecting a phase of clock appropriate for sampling from a 16-bit synchronization pattern.

It was also revealed that a second cause was as follows: for high-speed synchronization detection, the data sampling unit was required to sample synchronization pattern data in parallel by multiple clock signals and this parallel sampling increased the amount of processed data.

The invention has been made as the result of the above consideration made by the present inventors prior to the invention.

Consequently, it is an object of the invention to reduce the power consumption in sleep mode, in a semiconductor integrated circuit including an input interface externally supplied with an input signal, the input interface including a data sampling unit for selecting a phase of a sampling clock signal appropriate to sample payload data supplied as the above input signal.

It is another object of the invention to reduce the power consumption of a data sampling unit that performs parallel sampling operation after an appropriate phase of a sampling clock signal was selected.

The above and other objects and novel features of the invention will be apparent from the description in this specification and the accompanying drawings.

The following is a brief description of the gist of the representative elements of the invention laid open in this application:

A semiconductor integrated circuit (9) representative of the invention includes: an input interface (5) externally supplied with an input signal; and internal core circuits (72, 73, 75) supplied with signal data generated at the input interface as the result of reception of the input signal by the input interface.

The input interface (5) includes a hysteresis circuit (45) and a data sampling unit (4).

The hysteresis circuit (45) has first and second input thresholds (VthL, VthH). The hysteresis circuit detects the input signal having a predetermined voltage range between the first and second input thresholds as a sleep command.

The data sampling unit (4) selects a phase of a sampling clock signal appropriate for data sampling according to a synchronizing signal supplied as the input signal. The data sampling unit (4) samples payload data contained in the input signal by using a sampling clock signal having this selected phase.

When the hysteresis circuit (45) of the input interface (5) detects the above sleep command, a sleep signal generated at the hysteresis circuit (45) is supplied to the internal core circuits (72, 73, 75). In response to this sleep signal, the internal core circuits are controlled into sleep mode.

The sleep signal generated at the hysteresis circuit (45) is also supplied to the data sampling unit (4) of the input interface (5). In response to the sleep signal, as a result, the data sampling unit (4) is controlled into sleep mode. (Refer to FIG. 1.)

The following is a brief description of the gist of the effects obtained by the representative elements of the invention laid open in this application:

It is possible to reduce the power consumption in sleep mode in a semiconductor integrated circuit including an input interface externally supplied with an input signal, the input interface including a data sampling unit that selects a phase of a sampling clock signal appropriate to sample payload data supplied as the input signal.

DETAILED DESCRIPTION OF THE PREFERRED EMBODIMENTS

Representative Embodiments

Figure 1:
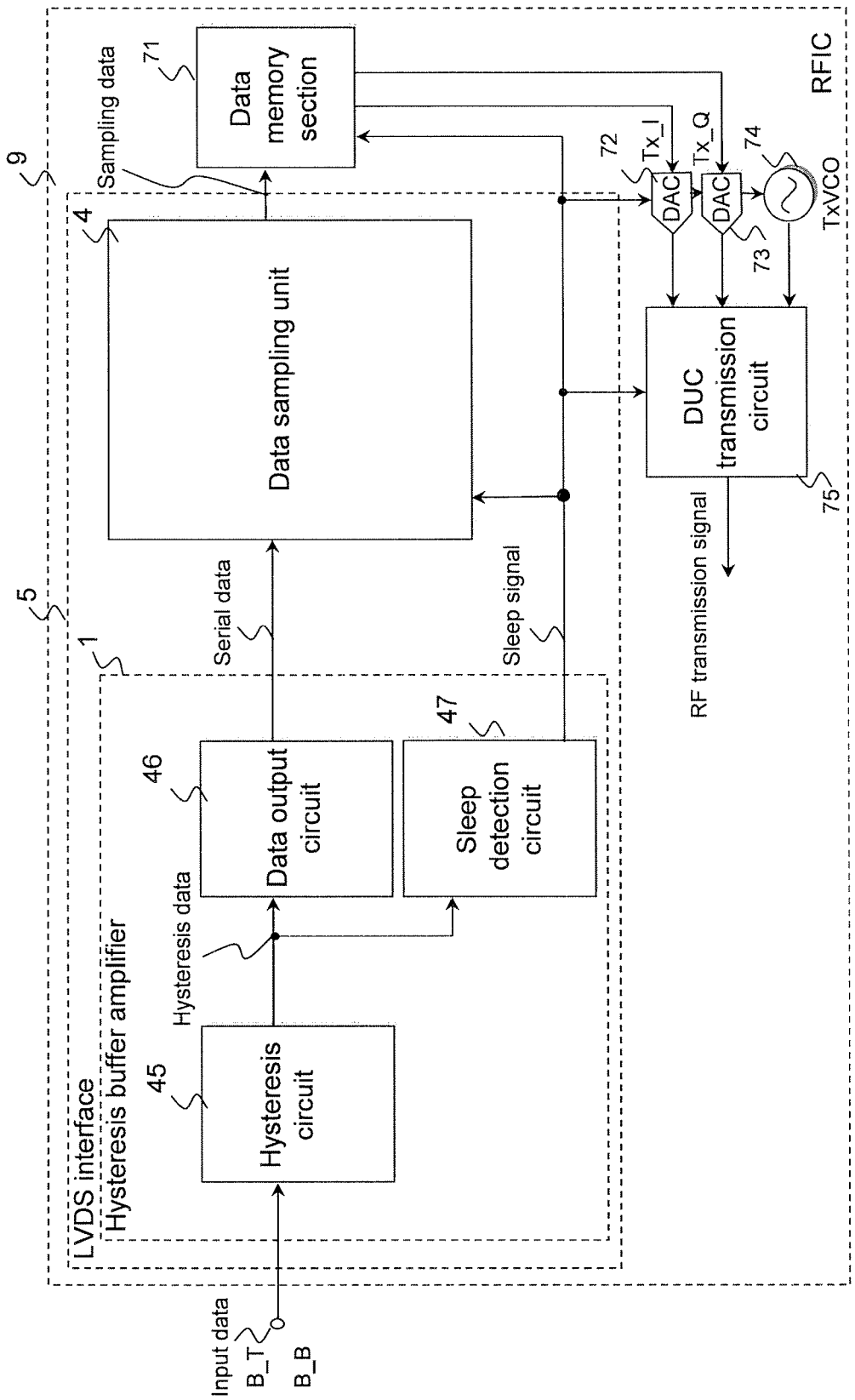
FIG. 1 illustrates the configuration of a semiconductor integrated circuit configured as a slave device in an embodiment of the invention.

First, description will be given to the outline of embodiments representative of the invention disclosed in this specification. The parenthesized reference numerals in the drawings referred to in the description of the outline of representative embodiments just indicate what is contained in the concepts of constituent elements to which the numerals are affixed as examples.

(1) A representative semiconductor integrated circuit (9) in an embodiment representative of the invention includes: an input interface (5) externally supplied with an input signal; and internal core circuits (72, 73, 75) supplied with signal data generated at the input interface as the result of reception of the input signal by the input interface.

The input interface (5) includes a hysteresis circuit (45) and a data sampling unit (4).

The hysteresis circuit (45) of the input interface (5) has a first input threshold (VthL) and a second input threshold (VthH). The hysteresis circuit (45) thereby detects the input signal having a predetermined voltage range between the first input threshold and the second input threshold as a sleep command.

The data sampling unit (4) of the input interface (5) selects a phase of a sampling clock signal appropriate to sample data in accordance with the data pattern of a synchronizing signal supplied as the above input signal. Then the data sampling unit (4) samples payload data contained in the input signal using a sampling clock signal having the selected phase.

When the hysteresis circuit (45) of the input interface (5) detects the above sleep command, a sleep signal generated at the hysteresis circuit (45) is supplied to the internal core circuits (72, 73, 75). In response to the sleep signal, the internal core circuits are controlled into sleep mode.

The above sleep signal generated at the hysteresis circuit (45) is also supplied to the data sampling unit (4) of the input interface (5). As a result, the data sampling unit (4) is controlled into sleep mode in response to the sleep signal. (Refer to FIG. 1.)

According to the above embodiment, not only the internal core circuits (72, 73, 75) are controlled into sleep mode when the semiconductor integrated circuit (9) is in sleep mode. The data sampling unit (4) included in the input interface (5) is also controlled into sleep mode in accordance with a sleep signal generated at the hysteresis circuit (45). According to the above embodiment, therefore, it is possible to reduce the power consumption of a semiconductor integrated circuit so configured that the following is implemented in sleep mode: the semiconductor integrated circuit includes an input interface and the input interface includes a data sampling unit for selecting a phase of a sampling clock signal appropriate to sample payload data.

In a semiconductor integrated circuit in a preferred embodiment, the data sampling unit (4) includes multiple data sampling circuits (21, 22, 23, 24) and a clock selection data determination circuit (25).

The data sampling circuits (21, 22, 23, 24) sample the data pattern ("1010") of the synchronizing signal (Sync) in parallel by multiple clock signals (CLK1, CLK2, CLK3, CLK4) different in phase from one another.

The clock selection data determination circuit (25) generates multiple clock signal selection signals (SEL1, SEL2, SEL3, SEL4) in response to multiple output signals outputted from the data sampling circuits (21, 22, 23, 24). It thereby selects as reference clock signal (CLK) one clock signal (CLK2) from among the clock signals (CLK1, CLK2, CLK3, CLK4) for generating the sampling clock signal used for sampling the payload data.

After the selection of the reference clock signal (CLK), one data sampling circuit (22) for generating the selected one clock signal (CLK2) is activated among the data sampling circuits (21, 22, 23, 24). Meanwhile, the other data sampling circuits (22) for generating the other unselected clock signals (CLK1, CLK3, CLK4) are deactivated. (Refer to FIG. 12.)

According to the above preferred embodiment, the power consumption of the data sampling unit (4) that performs parallel sampling operation can be reduced after an appropriate phase of a sampling clock signal is selected.

In a semiconductor integrated circuit in another preferred embodiment, the data sampling unit (4) stores the payload data sampled in accordance with the ticking of the above sampling clock in a memory (71).

The data sampling unit (4) generates a data end signal in response to the completion of storage of the payload data in the memory.

The input interface (5) further includes a sleep determination circuit (6) that is supplied with the sleep signal generated at the hysteresis circuit (45) and the data end signal generated at the data sampling unit (4) and thereby generates a sleep transition signal.

The sleep determination circuit (6) asserts the sleep transition signal in response to both the sleep signal and the data end signal being asserted.

In response to the sleep transition signal asserted by the sleep determination circuit (6), the internal core circuits (72, 73, 75) and the data sampling unit (4) are controlled into the above sleep mode. (Refer to FIG. 3.)

According to its exemplary embodiment, the data sampling unit (4) generates the data end signal based on the data size information of the header contained in the input signal. (Refer to FIG. 3.)

According to a more preferred embodiment, a sleep transition bit determination circuit (49, 45B1) is coupled to the hysteresis circuit (45) of the input interface (5).

The sleep transition bit determination circuit (49, 45B1) determines the level of a sleep transition bit during a bit period immediately after the last bit of the payload data. (Refer to FIG. 3 and FIG. 10.)

According to a further more preferred embodiment, the input interface (5) is configured as a differential signal interface that is supplied with differential input signals (B_T, B_B) as the above input signal. (Refer to FIG. 1 to FIG. 4.)

According to a concrete embodiment, the hysteresis circuit (45) of the input interface (5) includes: multiple differential amplifiers (A1, A2: B1, B2) that respond to the differential input signals (B_T, B_B) as the above input signal; and a sleep detection circuit (47) that responds to differential output signals (V32, V42) of at least one differential amplifier (B1, B2) of the differential amplifiers (A1, A2: B1, B2).

Thus the hysteresis circuit (45) of the input interface (5) operates as a window comparator that detects the input signal having the predetermined voltage range between the first input threshold and the second input threshold as the above sleep command. (Refer to FIG. 6 and FIG. 8.)

According to another concrete embodiment, the input interface (5) configured as the differential signal interface is a digital interface and this digital interface is supplied with a differential digital baseband signal.

The differential digital baseband signal is converted into a large-amplitude digital baseband signal having an amplitude signal larger than the differential amplitude of the differential digital baseband signal. This conversion is carried out by the hysteresis circuit (45) of the input interface (5) and the data sampling unit (4).

The internal core circuits (72, 73, 75) include D-A converters for transmission (72, 73) and an up conversion transmission circuit (75).

The large-amplitude digital baseband signal from the input interface (5) can be converted into an analog transmit baseband signal by the D-A converters for transmission (72, 73).

The analog transmit baseband signal from the D-A converters for transmission (72, 73) can be converted into an RF transmission signal by the up conversion transmission circuit (75). (Refer to FIG. 1.) According to one of the most concrete embodiments, the data sampling unit (4) carries out serial-parallel conversion of the input signal using the sampling clock signal. (Refer to FIG. 4 and FIG. 12.)

(2) A representative embodiment according to another aspect of the invention is an operation method for a semiconductor integrated circuit (9) including: an input interface (5) externally supplied with an input signal; and internal core circuits (72, 73, 75) supplied with signal data generated at the input interface as the result of reception of the input signal by the input interface.

The input interface (5) includes a hysteresis circuit (45) and a data sampling unit (4).

The hysteresis circuit (45) of the input interface (5) has a first input threshold (VthL) and a second input threshold (VthH). The hysteresis circuit (45) thereby detects the input signal having a predetermined voltage range between the first input threshold and the second input threshold as a sleep command.

The data sampling unit (4) of the input interface (5) selects a phase of a sampling clock signal appropriate to sample data in accordance with the data pattern of a synchronizing signal supplied as the above input signal. Then the data sampling unit (4) samples payload data contained in the input signal using a sampling clock signal having the selected phase.

When the hysteresis circuit (45) of the input interface (5) detects the above sleep command, a sleep signal generated at the hysteresis circuit (45) is supplied to the internal core circuits (72, 73, 75). In response to the sleep signal, the internal core circuits are controlled into sleep mode.

The above sleep signal generated at the hysteresis circuit (45) is also supplied to the data sampling unit (4) of the input interface (5). As a result, the data sampling unit (4) is controlled into sleep mode in response to the sleep signal. (Refer to FIG. 1.)

According to the above embodiment, not only the internal core circuits (72, 73, 75) are controlled into sleep mode when the semiconductor integrated circuit (9) is in sleep mode. The data sampling unit (4) included in the input interface (5) is also controlled into sleep mode in accordance with a sleep signal generated at the hysteresis circuit (45). According to the above embodiment, therefore, it is possible to reduce the power consumption of a semiconductor integrated circuit so configured that the following is implemented in sleep mode: the semiconductor integrated circuit includes an input interface and the input interface includes a data sampling unit for selecting a phase of a sampling clock signal appropriate to sample payload data.

Description of Embodiments

More detailed description will be given to embodiments. In all the drawings for explaining the best mode for carrying out the invention, the components having the same functions as in the above drawings will be marked with the same reference numerals and the repetitive description thereof will be omitted.

<<Configuration of Slave Device>>

FIG. 1 illustrates the configuration of a semiconductor integrated circuit configured as a slave device 9 in an embodiment of the invention.

The slave device 9 illustrated in FIG. 1 is, for example, RFIC, which receives a transmitted baseband signal from, for example, a baseband LSI, not shown, configured as a master device. A digital interface is implemented between the RFIC as slave device 9 and the baseband LSI as master device; therefore, the transmitted baseband signal is a digital signal. The digital transmit baseband signal is differential voltage in compliance with the standard DigRF v3, and the peak-to-peak voltage is 0.9 V and the minimum differential voltage is 100 mV.

To cause the RFIC as slave device 9 to shift to sleep mode, meanwhile, the baseband LSI as master device asserts a high level of "1" as a sleep transition bit during a bit period immediately after the last bit of a frame. Thereafter, a line driver is kept at common mode voltage obtained by reducing the difference voltage of the interface to −5 mV to +20 mV.

Therefore, the RFIC as slave device 9 illustrated in FIG. 1 includes an LVDS (Low Voltage Differential Signaling) interface 5 similar to the R-LVDS described in Non-patent Document 1.

The LVDS interface 5 includes a hysteresis buffer amplifier 1 and a data sampling unit 4. The hysteresis buffer amplifier 1 includes a hysteresis circuit 45 and a sleep detection circuit 47 for detecting common mode voltage supplied from the baseband LSI as master device to cause the RFIC as slave device 9 to shift to sleep mode. That is, the hysteresis circuit 45 of the hysteresis buffer amplifier 1 has a hysteresis input characteristic for detecting common mode voltage obtained by reducing the difference voltage of the digital interface to −5 mV to +20 mV. More detailed description will be given. The differential voltage of the digital interface set to substantially the identical potential by common mode voltage for transition to sleep mode is detected between the following input thresholds: the input threshold at a low level and the input threshold at a high level of the hysteresis input characteristic of the hysteresis circuit 45. In transmitting mode, meanwhile, the low level of "0" and the high level of "1" of a digital transmission baseband differential voltage signal contained in a frame supplied from the baseband LSI are detected as follows: the low level and the high level are respectively detected by using the low-level input threshold and the high-level input threshold of the hysteresis input characteristic of the hysteresis circuit 45.

The hysteresis circuit 45 of the hysteresis buffer amplifier 1 is realized by a window comparator comprised of multiple comparators. Therefore, the following processing is carried out: multiple comparative output signals of the window comparator of the hysteresis circuit 45 that responds to common mode voltage for transition to sleep mode are supplied to the sleep detection circuit 47; and a sleep signal supplied to the data sampling circuit 4 is thereby generated from the output of the sleep detection circuit 47. The sleep detection circuit 47 can detect the presence of the differential voltage of the digital interface set to substantially the identical potential by common mode voltage for transition to sleep mode. The sleep detection circuit detects it from a combination of signal levels of the multiple comparative output signals of the hysteresis circuit 45.

The data sampling circuit 4 of the LVDS interface 5 detects a synchronization pattern of a predetermined 16-bit code of "1010100001001011" composing the synchronization field contained in a frame of transmit data defined in the standard DigRF v3. By detecting the 16-bit synchronization pattern by the data sampling circuit 4, it is made possible to select a phase of a clock signal for sampling a transmitted baseband signal at the LVDS interface 5 in the RFIC as slave device 9.

The data output circuit 46 of the hysteresis buffer amplifier 1 forms serial data in response to a digital output signal from the hysteresis circuit 45. Further, it supplies the serial data to the data sampling unit 4 with low output impedance.

Sampling data from the data sampling circuit 4 is stored in a data memory section 71 that functions as a FIFO (First In/First Out) transmission memory used for the transmission operation of a cellular phone. In transmission operation, transmission digital baseband signals Tx_I, Tx_Q outputted from the data memory section 71 are converted into transmission analog baseband signals at the D-A converters 72, 73. The transmission analog baseband signals converted at the D-A converters 72, 73 and a transmission RF local signal generated at the transmission voltage control oscillator 74 are supplied to a direct up conversion (DUC) transmission circuit 75. An RF transmission signal is formed at the DUC transmission circuit 75.

When the transmission operation is completed, the baseband LSI as master device instructs the RFIC as slave device 9 to shift to sleep mode; therefore, a sleep signal is formed at the sleep detection circuit 47. In response to the sleep signal from the sleep detection circuit 47, the data sampling circuit 4, data memory section 71, D-A converters 72, 73, transmission voltage control oscillator 74, and DUC transmission circuit 75 shift to sleep mode. The RFIC as slave device 9 is brought into a low-power consumption state.

<<Data Sampling Unit>>

Figure 2:
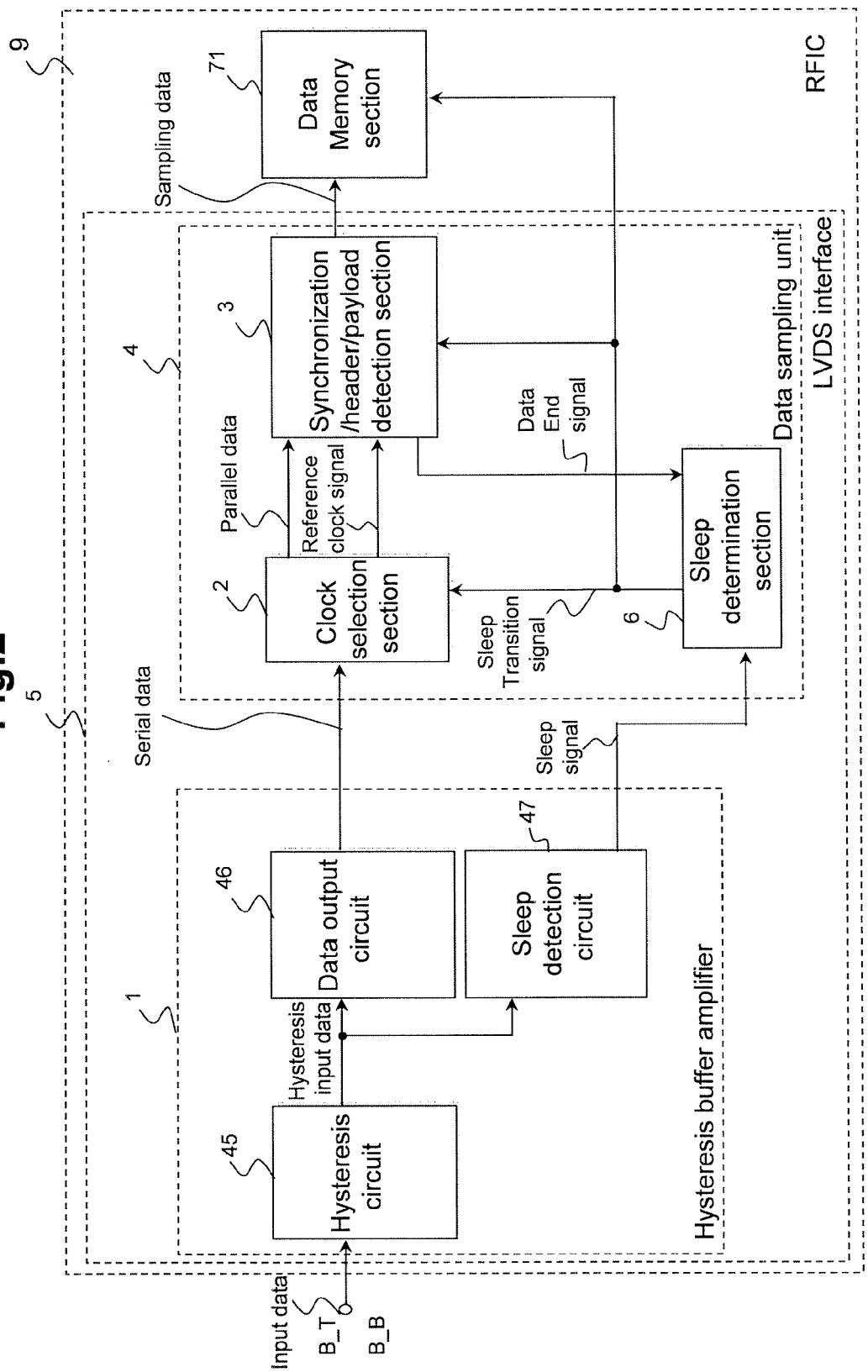
FIG. 2 illustrates the configuration of a semiconductor integrated circuit configured as a slave device in an embodiment of the invention similarly with FIG. 1.

FIG. 2 also illustrates the configuration of a semiconductor integrated circuit configured as a slave device 9 in an embodiment of the invention similarly with FIG. 1.

In FIG. 2 illustrating the RFIC as slave device 9, the internal configuration of the data sampling unit 4 of the LVDS interface 5 is depicted in more detail than in FIG. 1. Though not shown in FIG. 2, the RFIC as slave device 9 illustrated in FIG. 2 also includes D-A converters 72, 73, a transmission voltage control oscillator 74, and a DUC transmission circuit 75 as in FIG. 1.

The data sampling unit 4 of the RFIC as slave device 9 illustrated in FIG. 2 especially includes a clock selection section 2, a synchronization/header/payload detection section 3, and a sleep determination section 6.

To select a phase of a clock signal appropriate for sampling, the clock selection section 2 is supplied with the following: the first four bits "1010" of the synchronization pattern of a predetermined 16-bit code "1010100001001011" in the synchronization field contained in a frame of transmit data defined in the standard DigRF v3, supplied from the data output circuit 46; and multiple reference clock signals different in phase from one another. As a result, the clock selection section 2 selects a reference clock signal having a rising edge in substantially the mid position in the pulse width of each bit of the four bits "1010" from the reference clock signals different in phase from one another. The selected one reference clock signal is supplied as sampling clock from the clock selection section 2 to the synchronization/header/payload detection section 3. Further, the synchronization/header/payload detection section 3 is supplied with the remaining 12 lower-order bits "100001001011" of the 16-bit synchronization pattern in the synchronization field through the clock selection section 2 and thus accurate synchronization detection is carried out.

After the synchronization detection at the clock selection section 2 and the synchronization/header/payload detection section 3 using the 16-bit synchronization pattern in the synchronization field, the following takes place: digital signals of header and payload are supplied from the baseband LSI as master device to the synchronization/header/payload detection section 3 through the hysteresis buffer amplifier 1 and the clock selection section 2. At the synchronization/header/payload detection section 3, the digital signals of header and payload are sampled using the sampling clock selected at the clock selection section 2 and the sampled digital signals of header and payload are stored in the data memory section 71.

The synchronization/header/payload detection section 3 can determine the data size of payload from data size information contained in the header field. When storage of all the data in this data size in the data memory section 71 is completed, therefore, the synchronization/header/payload detection section 3 generates a data end signal and supplies it to the sleep determination section 6. In response to the sleep signal from the sleep detection circuit 47 and the data end signal from the synchronization/header/payload detection section 3, the sleep determination section 6 generates a sleep transition signal.

Therefore, as the result of the completion of the transfer of transmit data from the baseband LSI as master device to the RFIC as slave device 9, a sleep signal may be asserted from the sleep determination circuit 47 in the early stages. Meanwhile, in storage of the sampled digital signals of header and payload in the data memory section 71, a slight writing delay is produced. Consequently, the data end signal of the synchronization/header/payload detection section 3 supplied to the sleep determination section 6 may be asserted in the relatively early stages. In this case, the following takes place even though a sleep signal is asserted from the sleep determination circuit 47 in the early stages: the sleep determination section 6 does not assert the sleep transition signal in these stages and waits for the data end signal of the synchronization/header/payload detection section 3 to be asserted. In response to the data end signal being asserted, thereafter, the sleep determination section 6 asserts the sleep transition signal supplied to the clock selection section 2. As mentioned above, the sleep determination section 6 asserts a sleep transition signal supplied to the clock selection section 2 in response to both the following being asserted: a sleep signal from the sleep determination circuit 47 and a data end signal from the synchronization/header/payload detection section 3.

This sleep transition signal is supplied to the clock selection section 2, synchronization/header/payload detection section 3, and data memory section 71. It is also supplied to the D-A converters 72, 73, transmission voltage control oscillator 74, and DUC transmission circuit 75 in FIG. 1 and these circuits are brought into sleep mode and thus put into a low-power consumption state. Sleep mode in the clock selection section 2, synchronization/header/payload detection section 3, and data memory section 71 can be achieved by, for example, interrupting internal power supply voltage supplied to these circuits.

The data memory section 71 that functions as a FIFO transmission memory used in the transmission operation of a cellular phone can be configured as the embedded memory of the RFIC as slave device 9. However, when high-speed bulk data transmission is carried out with a cellular phone, an external memory, such as external high-speed SDRAM, of the RFIC as slave device 9 is used for the data memory section 71.

<<Sleep Transition Monitoring Circuit>>

Figure 3:
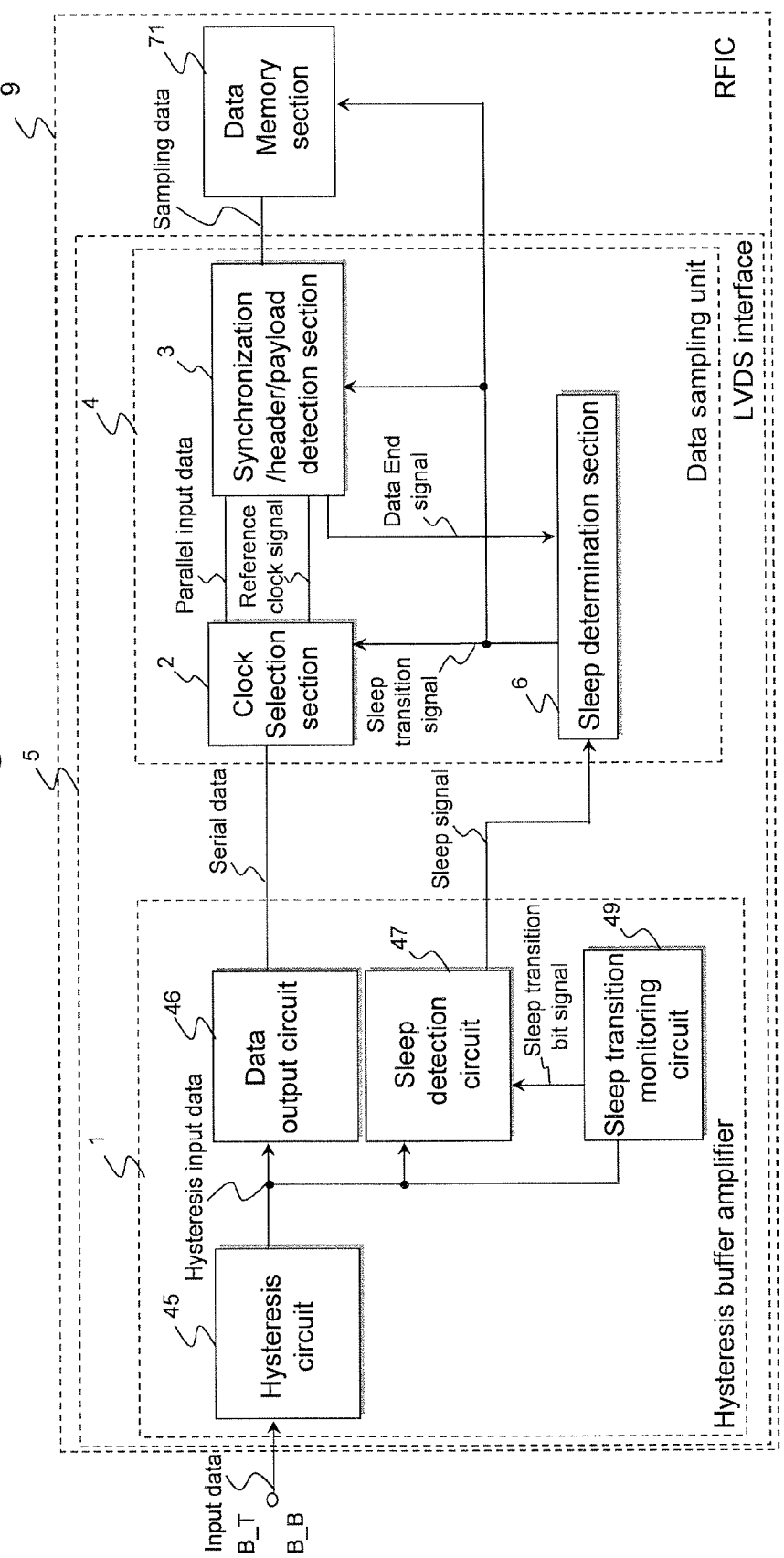
FIG. 3 illustrates the configuration of a semiconductor integrated circuit configured as a slave device in an embodiment of the invention similarly with FIG. 1 and FIG. 2.

FIG. 3 also illustrates the configuration of a semiconductor integrated circuit configured as a slave device 9 in an embodiment of the invention similarly with FIG. 1 and FIG. 2.

In the RFIC as slave device 9 illustrated in FIG. 3, a sleep transition monitoring circuit 49 is added to the internal circuitry of the hysteresis buffer amplifier 1 of the LVDS interface 5 unlike the REIC in FIG. 2.

According to the standard DigRF v3, as described above, to shift to sleep mode, a line driver asserts a high level of "1" as a sleep transition bit during a bit period immediately after the last bit of a frame. Thereafter, the line driver shifts into a low-power state in which it is kept at common mode voltage obtained by reducing the difference voltage of the interface to −5 mV to +20 mV. The sleep transition monitoring circuit 49 added to the internal circuitry of the hysteresis buffer amplifier 1 of the LVDS interface 5 in the RFIC as slave device 9 illustrated in FIG. 3 operates as follows: it detects a high level of "1" asserted as a sleep transition bit during a bit period immediately after the last bit of a frame supplied from the baseband LSI as master device before transition to sleep mode. As a result, the sleep transition monitoring circuit 49 becomes capable of determining transition to sleep mode. The position of the last bit of a frame can be determined by the sleep transition monitoring circuit 49 from data size information contained in the header field.

<<Details of Configuration of Data Sampling Unit>>

Figure 4:
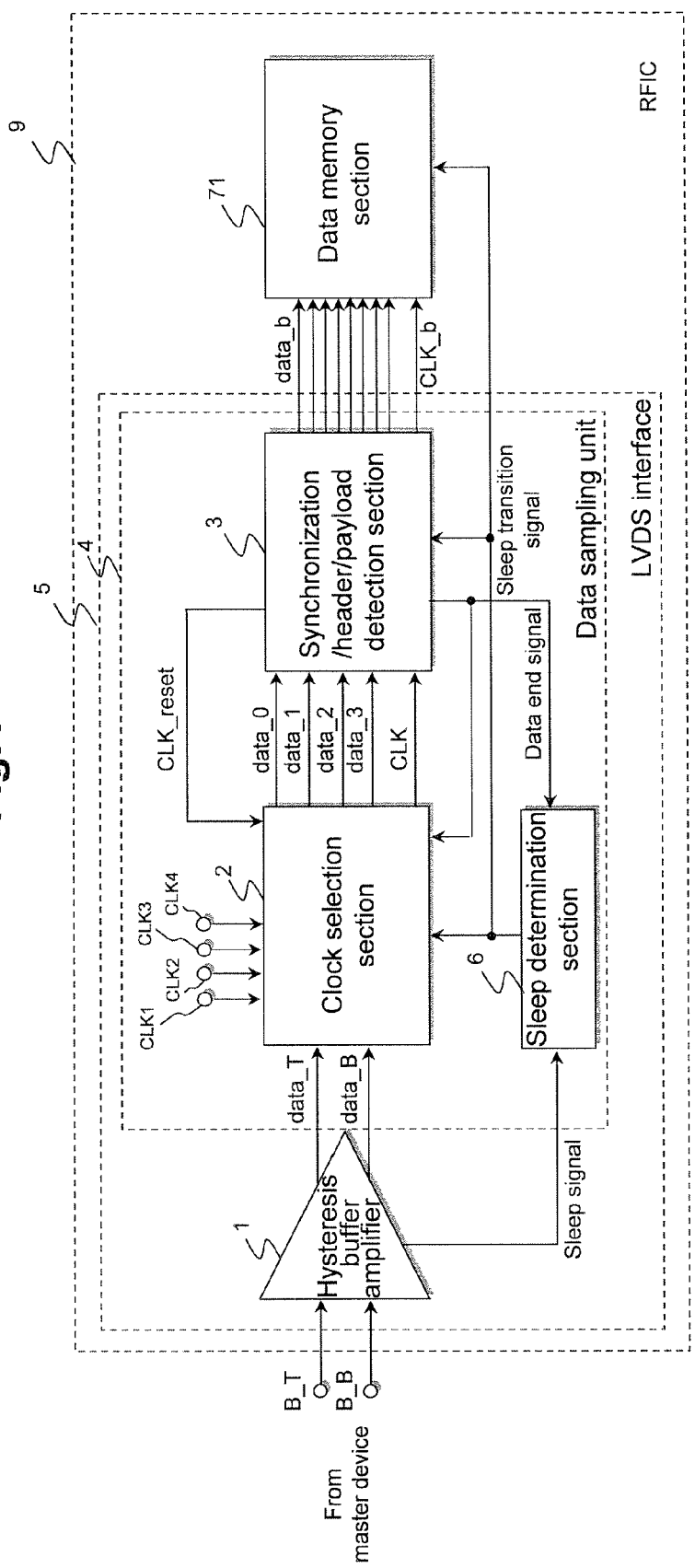
FIG. 4 illustrates the configuration of a semiconductor integrated circuit configured as a slave device in an embodiment of the invention similarly with FIG. 1, FIG. 2, and FIG. 3.

FIG. 4 also illustrates the configuration of a semiconductor integrated circuit configured as a slave device 9 in an embodiment of the invention similarly with FIG. 1, FIG. 2, and FIG. 3.

In FIG. 4 illustrating the RFIC as slave device 9, the internal configuration of the data sampling unit 4 of the LVDS interface 5 is depicted in detail. That is, the data sampling unit 4 includes a clock selection section 2, a sleep determination section 6, and a synchronization/header/payload detection section 3.

The hysteresis buffer amplifier 1 detects the differential amplitude voltage of differential input signals B_T, B_B of the digital interface in compliance with the standard DigRF v3 from the baseband LSI as master device. Therefore, when the hysteresis buffer amplifier 1 detects that this differential amplitude voltage is equal to common mode voltage set to −5 mV to +20 mV, the hysteresis buffer amplifier 1 outputs a sleep signal. Further, the hysteresis buffer amplifier 1 generates serial data output signals data_T, data_B in response to the differential input signals B_T, B_B of the digital interface in compliance with the standard DigRF v3 and supplies them to the data sampling unit 4.

The clock selection section 2 of the data sampling unit 4 is supplied with four clock signals CLK1, CLK2, CLK3, CLK4 different in phase, that is, whose phases are respectively 0 degrees, 90 degrees, 180 degrees, and 270 degrees. The frequency of the clock signals is set to 26 MHz for low-speed data communication and 312 MHz for high-speed data communication. As mentioned above, the first four bits "1010" in the 16-bit synchronization field contained in a transmission frame are supplied to the data sampling unit 4. Therefore, the clock selection section 2 selects the following clock signal as a reference clock signal CLK having an appropriate phase from among the four clock signals CLK1, CLK2, CLK3, CLK4 different in phase: a clock signal having a rising edge in substantially the mid position in the pulse width of each bit of the four bits "1010." Serial-parallel conversion of the serial data output signals data_T, data_B from the hysteresis buffer amplifier 1 is carried out at the clock selection section 2 in accordance with the reference clock signal CLK. Therefore, four bits of parallel data data_0, data_1, data_2, data_3 generated at the clock selection section 2 are supplied to the synchronization/header/payload detection section 3.

At the synchronization/header/payload detection section 3, synchronization detection of the remaining 12 lower-order bits "100001001011" of the 16-bit synchronization pattern in the synchronization field and determination of the header field are carried out. When storage of all the payload data in predetermined data size contained in the payload field in the data memory section 71 is completed, the synchronization/header/payload detection section 3 generates a data end signal and supplies it to the sleep determination circuit 6. In response to the sleep signal from the hysteresis buffer amplifier 1 and the data end signal from the synchronization/header/payload detection section 3, the sleep determination section 6 generates a sleep transition signal. This sleep transition signal is supplied to the clock selection section 2, synchronization/header/payload detection section 3, and data memory section 71. These circuits are brought into sleep mode and thus put into a low-power consumption state. Sleep mode in the clock selection section 2, synchronization/header/payload detection section 3, and data memory section 71 can be achieved by, for example, interrupting internal power supply voltage supplied to these circuits.

The four clock signals CLK1, CLK2, CLK3, CLK4 different in phase supplied to the clock selection section 2 of the data sampling unit 4 can be formed by PLL (Phase Locked Loop) that generates system clock SySClk generated at the RFIC as slave device 9. This system clock SySClk is clock used in the digital interface defined in the standard DigRF v3 and is supplied from the RFIC as slave device 9 to the baseband LSI as master device.

<<Congfiguration of Frame of Transmission Data>>

According to the standard DigRF v3, as described above, transmission data including transmit data and reception data is divided into multiple frames and each frame contains three fields, synchronization, header, and payload.

Figure 5:
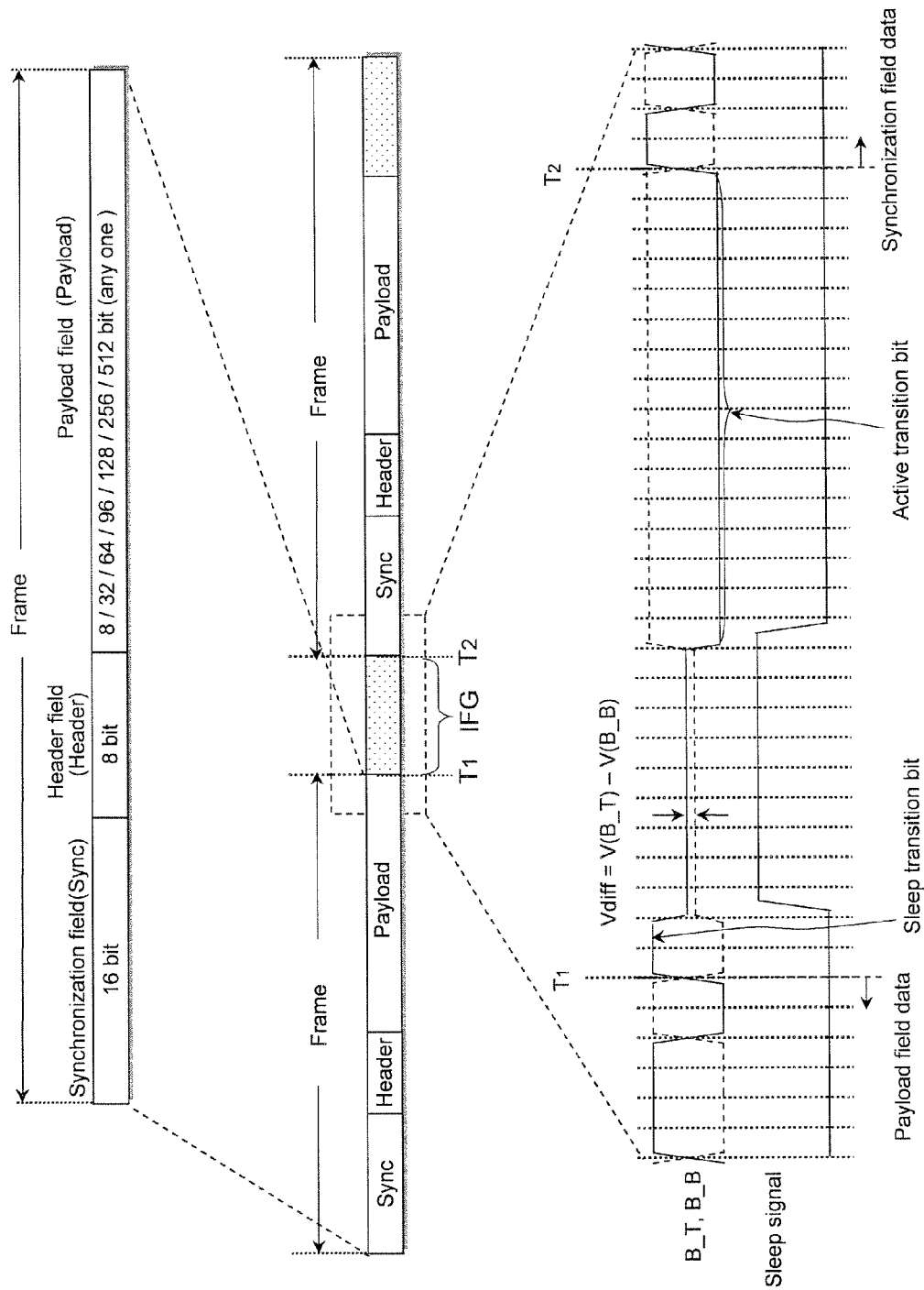
FIG. 5 illustrates the configuration of frames of transmission data defined in the standard DigRF v3.

FIG. 5 illustrates the configuration of frames of transmission data defined in the standard DigRF v3. One frame contains a synchronization field (Sync), a header field (Header), and a payload field (Payload). In the interframe gap IFG between the ending time $T_1$ of a preceding frame and the starting time $T_2$ of the subsequent frame, sleep mode is established.

More strictly, the RFIC as slave device 9 shifts to sleep mode when the following differential amplitude voltage is equal to common mode voltage set to −5 mV to +20 mV: the differential amplitude voltage $\{Vdiff=V(B\_T)-V(B\_B)\}$ of the differential input signals B_T, B_B of the digital interface of the hysteresis buffer amplifier 1 driven by the baseband LSI as master device during the interframe gap IFG.

In FIG. 5, a sleep transition bit asserted a high level of "1" during a bit period immediately after the ending time $T_1$ of the preceding frame is indicated. In FIG. 5, an active transition bit negated a low level during a period of at least eight bits (for high-speed clock) immediately before the starting time $T_2$ of the subsequent frame to exit from sleep mode is also indicated.

<<Hysteresis Buffer Amplifier of Basic Configuration>>

Figure 6:
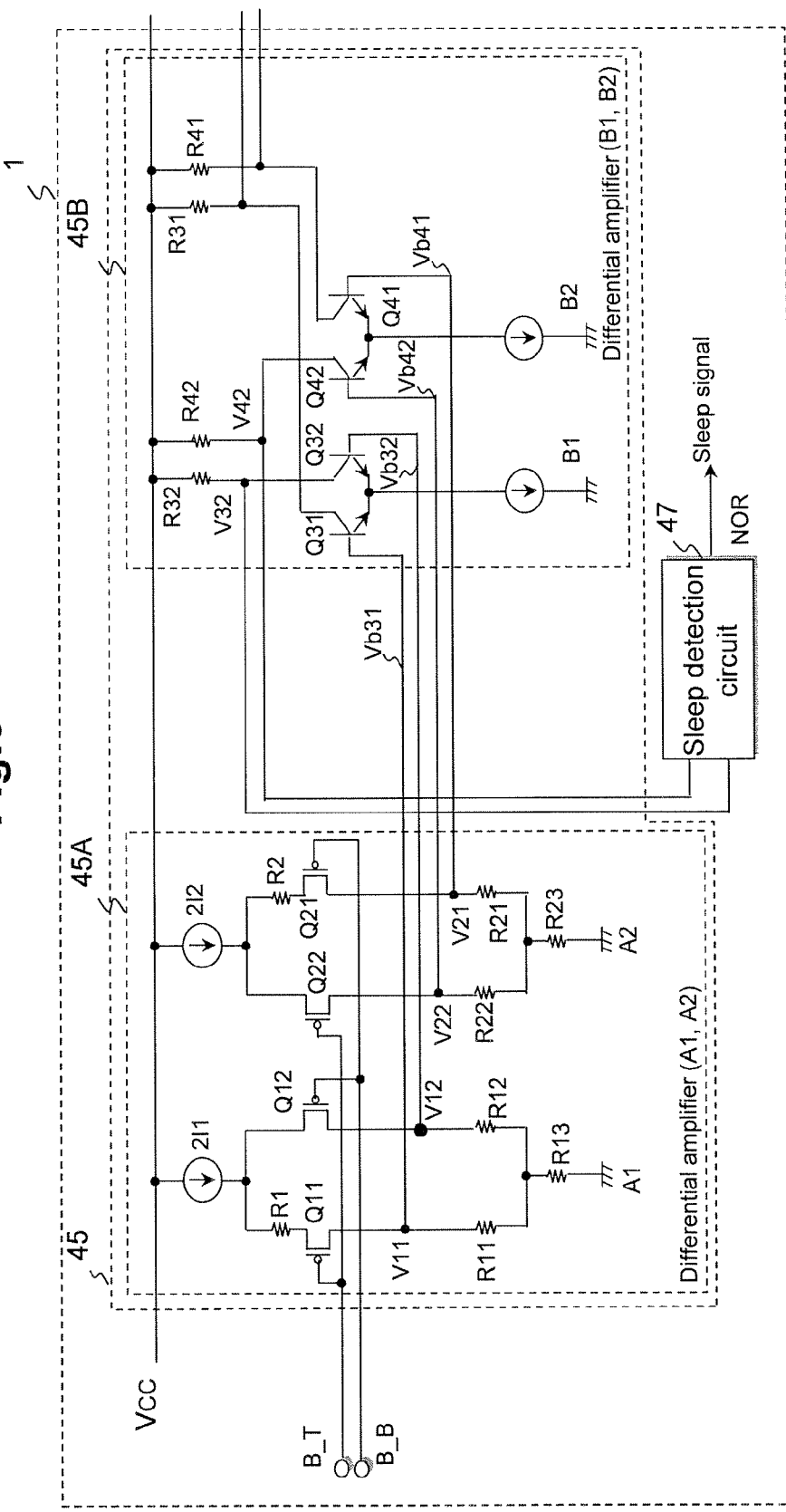
FIG. 6 illustrates the basic configuration of a hysteresis buffer amplifier in a semiconductor integrated circuit configured as a slave device in an embodiment of the invention illustrated in FIG. 1 to FIG. 4.

FIG. 6 illustrates the basic configuration of the hysteresis buffer amplifier 1 of a semiconductor integrated circuit configured as a slave device 9 in an embodiment of the invention illustrated in FIG. 1 to FIG. 4.

The hysteresis circuit 45 of the hysteresis buffer amplifier 1 in FIG. 6 is comprised of a former-stage differential amplifier 45A and a latter-stage differential amplifier 45B that respectively operate as a comparator. The two differential amplifiers A1, A2 of the former-stage differential amplifier 45A are comprised of source resistors R1, R2 so that it has an offset characteristic.

One differential amplifier A1 is comprised of a constant-current source with a constant current of 2I1, the offset generation source resistor R1, a p-channel MOS transistor pair Q11, Q12, and load resistors R11, R12, R13. The other differential amplifier A2 is comprised of a constant-current source with a constant current of 2I2, the offset generation source resistor R2, a p-channel MOS transistor pair Q21, Q22, and load resistors R21, R22, R23. That is, in the one differential amplifier A1, the p-channel MOS transistor Q11 is coupled with the offset generation source resistor R1 but the p-channel MOS transistor Q12 is not coupled with any offset generation source resistor. In the other differential amplifier A2, the p-channel MOS transistor Q21 is coupled with the offset generation source resistor R2 but the p-channel MOS transistor Q22 is not coupled with any offset generation source resistor. Therefore, the following takes place even when the differential input signals B_T, B_B of the digital interface of the hysteresis buffer amplifier 1 are at the same potential: in the one differential amplifier A1, the conductance of the p-channel MOS transistor Q11 takes a value smaller than that of the conductance of the p-channel MOS transistor Q12; and also in the other differential amplifier A2, the conductance of the p-channel MOS transistor Q21 takes a value smaller than that of the conductance of the p-channel MOS transistor Q22.

Figure 7:
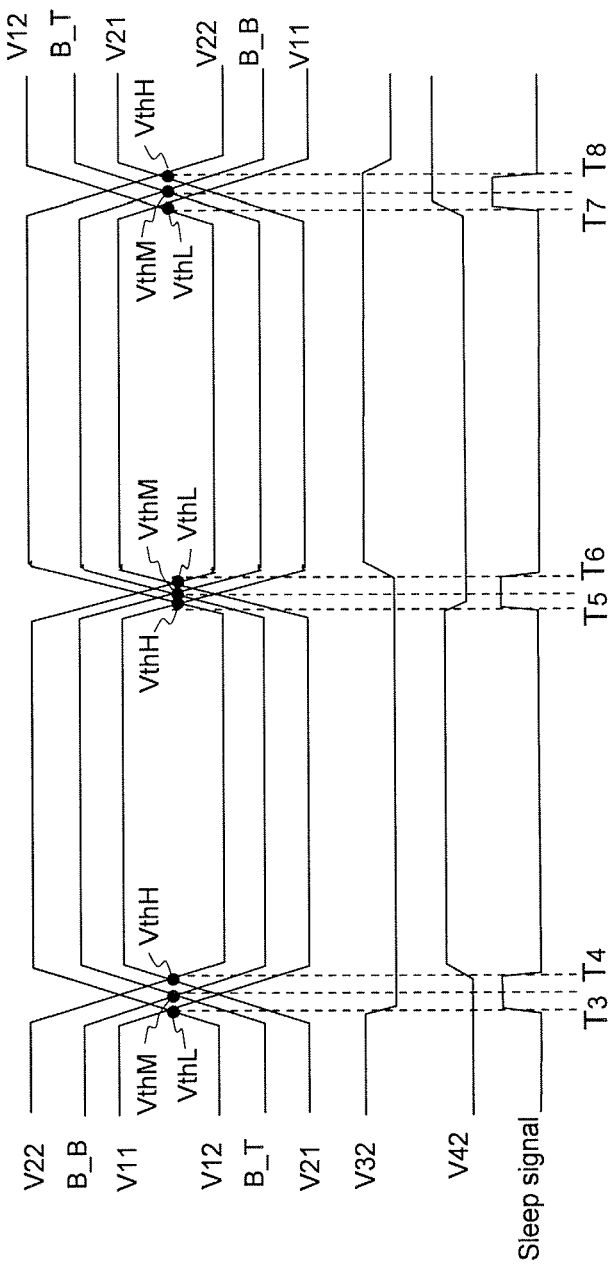
FIG. 7 is a chart indicating the signal waveform of each part of the hysteresis buffer amplifier illustrated in FIG. 6.

FIG. 7 indicates the signal waveform of each part of the hysteresis buffer amplifier 1 illustrated in FIG. 6.

Because of a difference in the conductance between the p-channel MOS transistor pair Q11, Q12 in the one differential amplifier A1 of the former-stage differential amplifier 45A of the hysteresis buffer amplifier 1 in FIG. 6, the following takes place: as indicated in FIG. 7, the drain voltage V11 of the p-channel MOS transistor Q11 is lower than the drain voltage V12 of the p-channel MOS transistor Q12 when the differential input signals B_T, B_B are at the equal potential. In the example in FIG. 7, the time when the differential input signals B_T, B_B are at the equal potential is substantially the midpoint between time $T_3$ and time $T_4$, substantially the midpoint between time $T_5$ and time $T_6$, and substantially the midpoint between time $T_7$ and time $T_8$.

Because of a difference in conductance between the p-channel MOS transistor pair Q21, Q22 in the other differential amplifier A2 of the former-stage differential amplifier 45A of the hysteresis buffer amplifier 1 in FIG. 6, the following takes place: as indicated in FIG. 7, the drain voltage V21 of the p-channel MOS transistor Q21 is lower than the drain voltage V22 of the p-channel MOS transistor Q22 when the differential input signals B_T, B_B are at the equal potential.

As illustrated in FIG. 7, further, the following phases substantially correspond with each other: the phase of the voltage waveform of the non-inverting input signal B_T of the differential input signals B_T, B_B; and the phases of the voltage waveform of the drain voltage V12 of the p-channel MOS transistor Q12 in the one differential amplifier A1 and the voltage waveform of the drain voltage V21 of the p-channel MOS transistor Q21 in the other differential amplifier A2. Further, the following phases substantially correspond with each other: the phase of the voltage waveform of the inverting input signal B_B of the differential input signals B_T, B_B; and the phases of the voltage waveform of the drain voltage V11 of the p-channel MOS transistor Q11 in the one differential amplifier A1 and the voltage waveform of the drain voltage V22 of the p-channel MOS transistor Q22 in the other differential amplifier A2.

As indicated in FIG. 7, further, the voltage waveform of the non-inverting input signal B_T of the differential input signals B_T, B_B and the voltage waveform of the inverting input signal B_B cross over an intermediate threshold VthM at the following points of time: substantially the midpoint between time $T_3$ and time $T_4$, substantially the midpoint between time $T_5$ and time $T_6$, and substantially the midpoint between time $T_7$ and time $T_8$. As indicated in FIG. 7, further, the drain voltage V11 of the p-channel MOS transistor Q11 in the one differential amplifier A1 and the drain voltage V12 of the p-channel MOS transistor Q12 cross over a low threshold VthL at the following times: time $T_3$, time $T_5$, and time $T_7$. As indicated in FIG. 7, further, the drain voltage V21 of the p-channel MOS transistor Q21 in the other differential amplifier A2 and the drain voltage V22 of the p-channel MOS transistor Q22 cross over a high threshold VthH at the following times: time $T_4$, time $T_6$, and time $T_8$.

As illustrated in FIG. 6, the drain voltage V11 of the p-channel MOS transistor Q11 in the one differential amplifier A1 of the former-stage differential amplifier 45A and the drain voltage V12 of the p-channel MOS transistor Q12 are respectively supplied to the following: the base of the npn transistor Q31 in one differential amplifier B1 of the latter-stage differential amplifier 45B and the base of the npn transistor Q32. Similarly, the drain voltage V21 of the p-channel MOS transistor Q21 in the other differential amplifier A2 of the former-stage differential amplifier 45A and the drain voltage V22 of the p-channel MOS transistor Q22 are respectively supplied to the following: the base of the npn transistor Q41 in the other differential amplifier B2 of the latter-stage differential amplifier 45B and the base of the npn transistor Q42.

Therefore, the transistors Q31, Q32 in the one differential amplifier B1 of the latter-stage differential amplifier 45B detect the following at times $T_3, T_5, T_7$: cross-over of the drain voltages V11, V12 of the transistors Q11, Q12 in the one differential amplifier A1 of the former-stage differential amplifier 45A with the low threshold VthL. Further, the transistors Q41, Q42 in the other differential amplifier B2 of the latter-stage differential amplifier 45B detect the following at times time $T_4$, $T_6$, $T_8$: cross-over of the drain voltages V21, V22 of the transistors Q21, Q22 in the other differential amplifier A2 of the former-stage differential amplifier 45A with the high threshold VthH.

As a result, the collector voltage V32 of the transistor Q32 in the one differential amplifier B1 of the latter-stage differential amplifier 45B shifts as follows: it shifts from a high level of "1" to a low level of "0" at time $T_3$, shifts from a low level of "0" to a high level of "1" at time $T_6$, and shifts from a high level of "1" to a low level of "0" at time $T_8$. Further, the collector voltage V42 of the transistor Q42 in the other differential amplifier B2 of the latter-stage differential amplifier 45B shifts as follows: it shifts from a low level of "0" to a high level of "1" at time $T_4$, shifts from a high level of "1" to a low level of "0" at time $T_5$, and shifts from a low level of "0" to a high level of "1" at time $T_7$.

The following collector voltages are supplied to the sleep detection circuit 47: the collector voltage V32 of the transistor Q32 in the one differential amplifier B1 of the latter-stage differential amplifier 45B of the hysteresis circuit 45 of the hysteresis buffer amplifier 1 in FIG. 6; and the collector voltage V42 of the transistor Q42 in the other differential amplifier B2. The sleep detection circuit 47 carries out NOR signal processing with respect to the two input signals. Therefore, a sleep signal of high level is generated at the sleep detection circuit 47 during the period from time $T_3$ to time $T_4$, the period from time $T_5$ to time $T_6$, and the period from time $T_7$ to time $T_8$.

As mentioned above, the one differential amplifier A1 and the other differential amplifier A2 of the former-stage differential amplifier 45A of the hysteresis buffer amplifier 1 including the offset generation source resistors R1, R2 generate the following: the low threshold VthL and the high threshold VthH of the hysteresis characteristic of the hysteresis circuit 45. The one differential amplifier B1 and the other differential amplifier B2 of the latter-stage differential amplifier 45B and the sleep detection circuit 47 of the hysteresis buffer amplifier 1 operate as a window comparator that detects the following: a sleep mode period between the low threshold VthL and the high threshold VthH.

That is, a sleep signal of high level is generated when the relation expressed by the expressions below hold between the following: the differential amplitude voltage Vdiff=V(B_T)—V(B_B) of the non-inverting input signal B_T and the inverting input signal B_B of the differential input signals B_T, B_B of the hysteresis buffer amplifier 1 and the low threshold VthL and the high threshold VthH.

$VthL \leq Vdiff = V(B\_T) - V(B\_B) \leq VthH$  (Expression 1)

$VthL = -R1 \cdot I1$  (Expression 2)

$VthH = +R2 \cdot I2$  (Expression 3)

where R1 and R2 are the resistance values of the offset generation source resistors R1, R2 in the one and other differential amplifiers A1, A2 of the former-stage differential amplifier 45A of the hysteresis buffer amplifier 1 illustrated in FIG. 6; and I1 and I2 are current values equivalent to ½ of the constant currents of the constant-current sources 2I1, 2I2.

<<Hysteresis Buffer Amplifier with Source Follower Added>>

Figure 8:
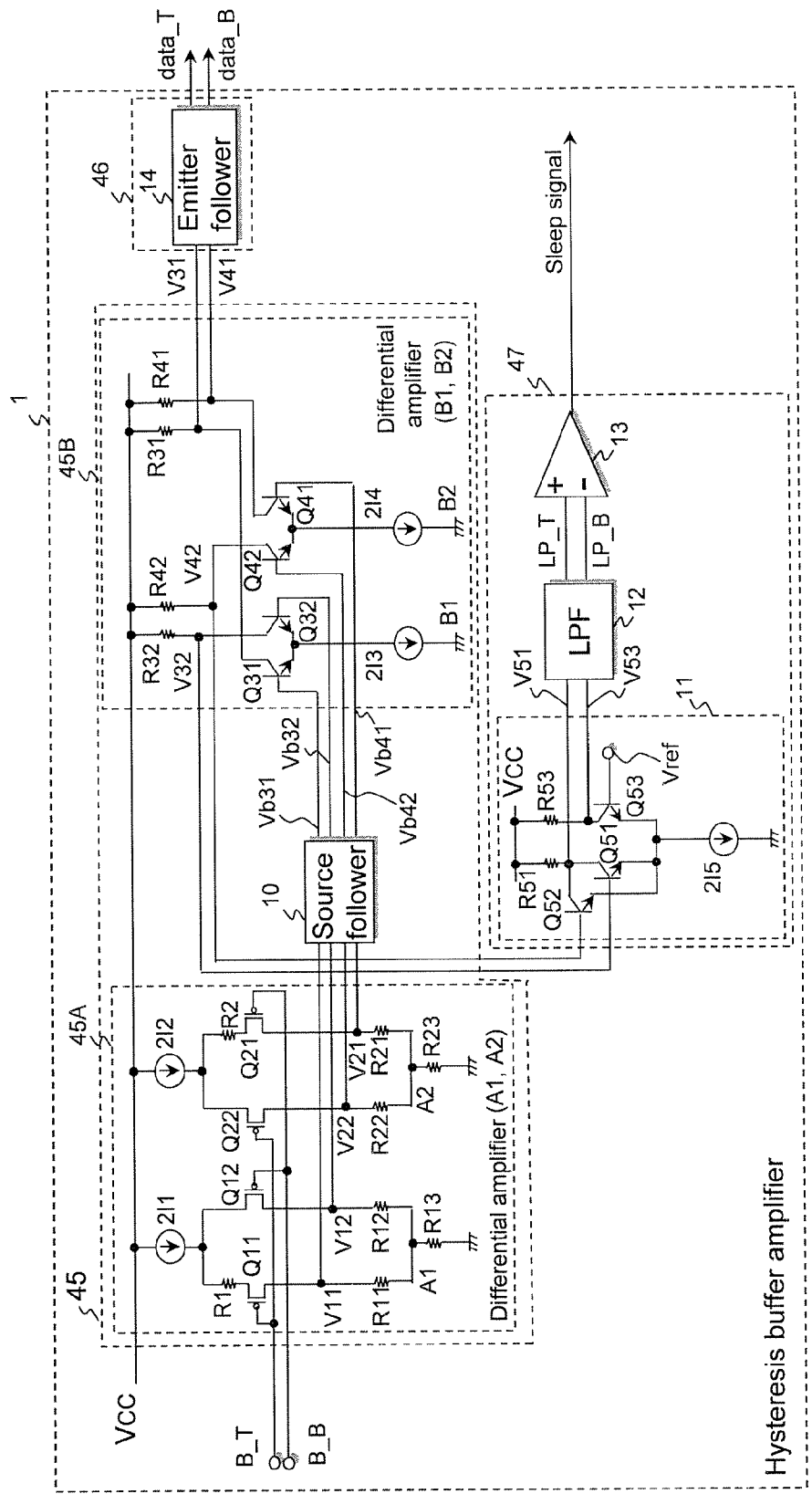
FIG. 8 illustrates the basic configuration of a hysteresis buffer amplifier in a semiconductor integrated circuit configured as a slave device in an embodiment of the invention illustrated in FIG. 1 to FIG. 4.

FIG. 8 illustrates the basic configuration of the hysteresis buffer amplifier 1 of a semiconductor integrated circuit configured as a slave device 9 in an embodiment of the invention illustrated in FIG. 1 to FIG. 4.

The hysteresis buffer amplifier 1 illustrated in FIG. 8 has a source follower 10 added thereto unlike the hysteresis buffer amplifier 1 illustrated in FIG. 6. The former-stage amplifier 45A of the hysteresis circuit 45 of the hysteresis buffer amplifier 1 illustrated in FIG. 6 uses the p-channel MOS transistors Q11, Q12, Q21, Q22. Therefore, the drain voltages V11, V12, V21, V22 are shifted in the direction of ground potential level GND.

The drain voltages V11, V12, V21, V22 of the former-stage amplifier 45A are required to drive the bases of the npn bipolar transistors Q31, Q32, Q41, Q42 in the latter-stage amplifier 45B. The emitters of the bipolar transistors Q31, Q32, Q41, Q42 are coupled with the constant-current sources set to constant currents of 2I3 and 2I4. Therefore, it is required to set the voltage level supplied to the constant-current sources high to some extent to make favorable the constant current characteristics of these constant-current sources as well. In addition, the base-emitter forward voltage of the bipolar transistors Q31, Q32, Q41, Q42 generally has a value larger than that of the gate-source voltage of MOS transistors. Therefore, it is also required to set the base potential of the npn bipolar transistors Q31, Q32, Q41, Q42 of the latter-stage amplifier 45B high to some extent.

For the above reason, the source follower 10 is added to the hysteresis buffer amplifier 1 illustrated in FIG. 8. The source follower 10 illustrated in FIG. 8 is used to implement the following: the drain voltages V11 to V22 of low voltage level of the p-channel MOS transistors Q11 to Q22 of the former-stage amplifier 45A are level-shifted to the high voltage side; and they are supplied to the bases of the npn bipolar transistors Q31 to Q42 of the latter-stage amplifier 45B. In the source follower 10 illustrated in FIG. 8, the drain voltages V11, V12, V21, V22 of the former-stage amplifier 45A are supplied to the gates of the four p-channel MOS transistors; and voltage for driving the bases of the npn bipolar transistors Q31 to Q42 of the latter-stage amplifier 45B is generated at the sources of the four p-channel MOS transistors.

FIG. 8 shows that an emitter follower 14 is provided in the hysteresis buffer amplifier 1. This emitter follower is included in the data output circuit 46 of low output impedance for supplying serial data to the data sampling circuit 4 illustrated in FIG. 1 to FIG. 4.

FIG. 8 illustrating the hysteresis buffer amplifier 1 also shows that the sleep detection circuit 47 illustrated in FIG. 1 to FIG. 3 includes a differential NOR circuit 11, a low-pass filter 12, and a differential amplifier 13. The differential NOR circuit 11 is comprised of npn bipolar transistors Q51, Q52, Q52, resistors R51, R53, and a constant-current source with a constant current of 2I5. The bases of the transistor Q51, Q52 are respectively supplied with the collector voltages V32, V42 of the npn bipolar transistors Q32, Q42 in the latter-stage amplifier 45B and the base of the transistor Q53 is supplied with reference voltage Vref. Further, the collector voltages V51, V53 of the transistors Q51, Q53 are respectively supplied to the differential input terminals of the low-pass filter 12; and the differential output signals LP_T, LP_B of the low-pass filter 12 are respectively supplied to the non-inverting input terminal and the inverting input terminal of the differential amplifier 13. Then a sleep signal is outputted from the output terminal of the differential amplifier 13.

Figure 9:
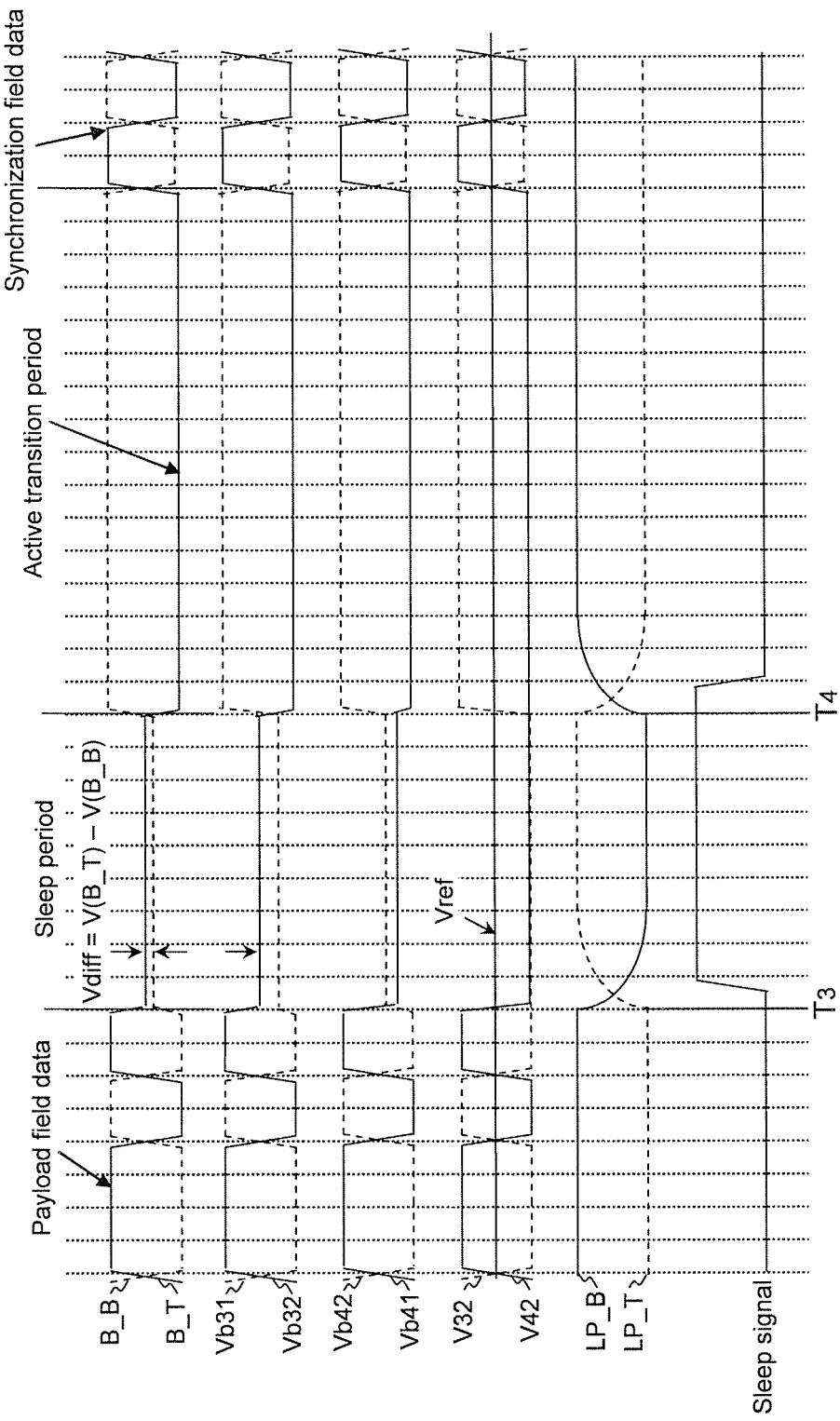
FIG. 9 is a chart indicating the signal waveform of each part of the hysteresis buffer amplifier illustrated in FIG. 8.

FIG. 9 indicates the signal waveform of each part of the hysteresis buffer amplifier 1 illustrated in FIG. 8.

In FIG. 9, the sleep period between time $T_3$ and time $T_4$ in the signal waveform chart in FIG. 7 is especially enlarged as compared with FIG. 7.

The following phases substantially correspond with each other: the phase of the voltage waveform of the non-inverting input signal B_T of the differential input signals B_T, B_B as data in the payload field; and the phases of the voltage waveform of the base voltage Vb32 of the transistor Q32 in the latter-stage amplifier 45B and the voltage waveform of the base voltage Vb41 of the transistor Q41. Further, the following phases substantially correspond with each other: the phase of the voltage waveform of the inverting input signal B_B of the differential input signals B_T, B_B; and the phases of the voltage waveform of the base voltage Vb31 of the transistor Q31 in the latter-stage amplifier 45B and the voltage waveform of the base voltage Vb42 of the transistor Q42.

As indicated at the fourth part from the top in FIG. 9, therefore, the following phases substantially correspond with each other: the phase of the voltage waveform of the non-inverting input signal B_T of the differential input signals B_T, B_B and the phase of the voltage waveform of the collector voltage V42 of the transistor Q42. Further, the following phases substantially correspond with each other: the phase of the voltage waveform of the inverting input signal B_B of the differential input signals B_T, B_B and the phase of the voltage waveform of the collector voltage V32 of the transistor Q32. As a result, when comparison with the level of the reference voltage Vref at the base of the transistor Q53 is carried out in response to the differential input signals B_T, B_B as payload field data, the following takes place: the level of either of the base voltage of the transistor Q51 and the base voltage of the transistor Q52 respectively supplied with the collector voltage V32 of the transistor Q32 and the collector voltage V42 of the transistor Q42 is higher. During the payload field data period, therefore, the collector voltage V51 of the transistor Q51 in the differential NOR circuit 11 is brought to low level; the collector voltage V53 of the transistor Q53 is brought to high level; and the differential output signals LP_T, LP_B of the low-pass filter 12 are respectively brought to low level and high level. As a result, the sleep signal from the output terminal of the differential amplifier 13 is also brought to low level.

During the sleep period between time $T_3$ and time $T_4$ in FIG. 9, the difference voltage of the differential input signals B_T, B_B is substantially zero. As in FIG. 7, therefore, the following takes place: the base voltage of the transistor Q51 and the base voltage of the transistor Q52 which transistors are respectively supplied with the collector voltage V32 of the transistor Q32 and the collector voltage V42 of the transistor Q42 are both brought to low level. During the sleep period, therefore, the collector voltage V51 of the transistor Q51 in the differential NOR circuit 11 is brought to high level; the collector voltage V53 of the transistor Q53 is brought to low level; and the differential output signals LP_T, LP_B of the low-pass filter 12 are respectively brought to high level and low level. As a result, the sleep signal from the output terminal of the differential amplifier 13 is also brought to high level.

In the example in FIG. 9, the hysteresis buffer amplifier exits from sleep mode immediately after the ending time $T_4$ of the sleep period. Therefore, an active transition period defined by an active transition bit negated a low level during the period of at least eight bits immediately before the starting time of the subsequent frame is also indicated.

<<Hysteresis Buffer Amplifier with Sleep Transition Bit Determination Circuit Added>>

To cause the RFIC as slave device 9 to shift to sleep mode, as mentioned above, the baseband LSI as master device asserts a high level of "1" as a sleep transition bit during the bit period immediately after the last bit of a frame.

Figure 10:
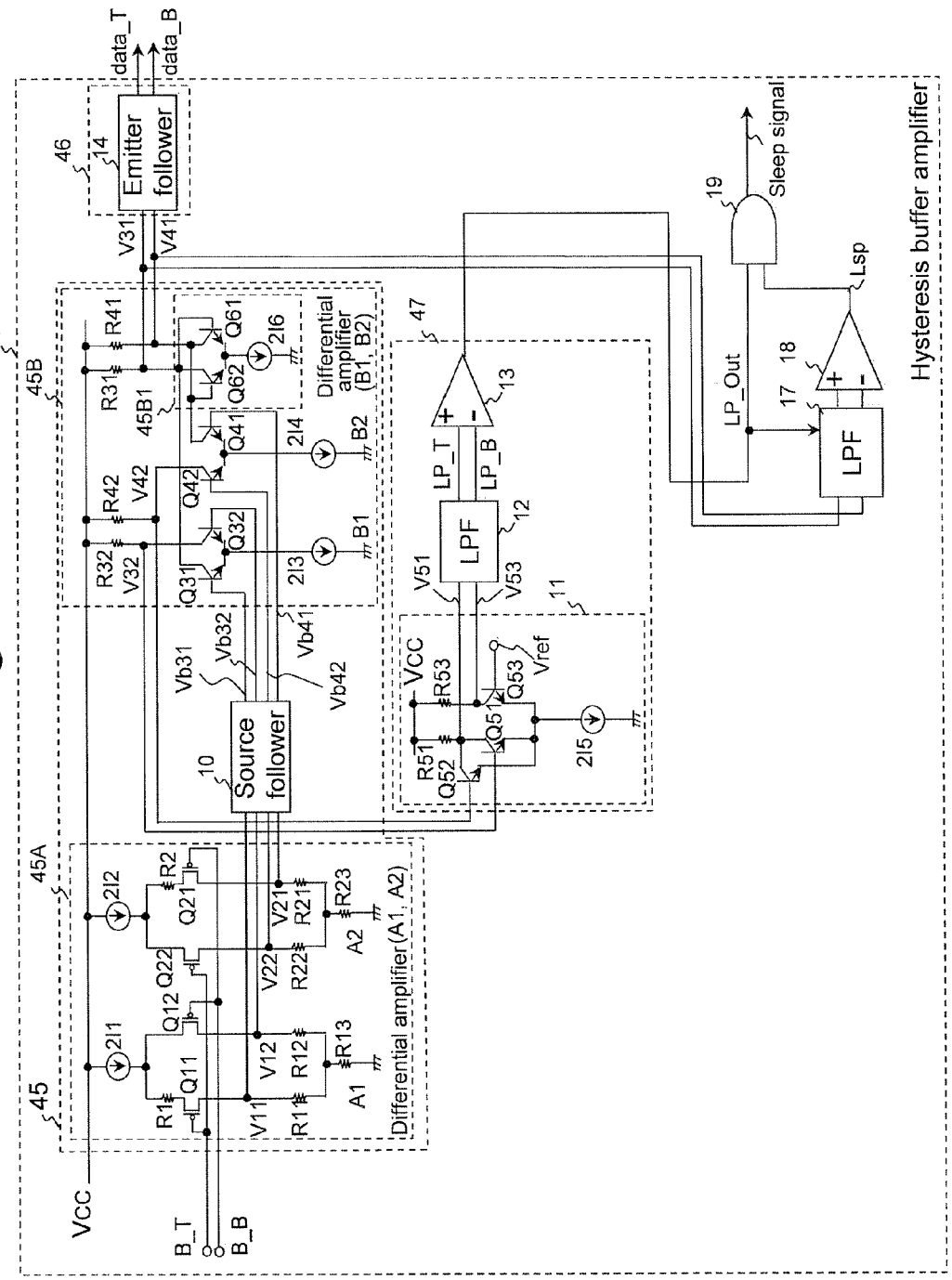
FIG. 10 illustrates a configuration in which a sleep transition bit determination circuit for determining a sleep transition bit asserted a high level of "1" for transition to sleep mode is added to the latter amplifier of the hysteresis buffer amplifier illustrated in FIG. 8.

FIG. 10 illustrates a configuration in which a sleep transition bit determination circuit 45B1 is added to the latter-stage amplifier 45B of the hysteresis buffer amplifier 1 illustrated in FIG. 8. This sleep transition bit determination circuit is used to determine a sleep transition bit asserted a high level of "1" for transition to sleep mode.

The sleep transition bit determination circuit 45B1 illustrated in FIG. 10 is a differential latch circuit and is comprised of npn bipolar transistors Q61, Q62 and a constant-current source with a constant current of 2I6. The base of the transistor Q61 and the collector of the transistor Q62 are coupled to the collector of the transistor Q31 in the latter-stage amplifier 45B; and the base of the transistor Q62 and the collector of the transistor Q61 are coupled to the collector of the transistor Q41 in the latter-stage amplifier 45B. In the hysteresis buffer amplifier 1 illustrated in FIG. 10, further, another low-pass filter 17 and another differential amplifier 18 are coupled to the output of the sleep transition bit determination circuit 45B1 of the latter-stage amplifier 45B; and an AND circuit 19 and another low-pass filter 17 are coupled to the output of the differential amplifier 13 of the sleep detection circuit 47. The other regards with respect to the configuration of the hysteresis buffer amplifier 1 illustrated in FIG. 10 are the same as those with respect to the configuration of the hysteresis buffer amplifier 1 illustrated in FIG. 8.

Figure 11:
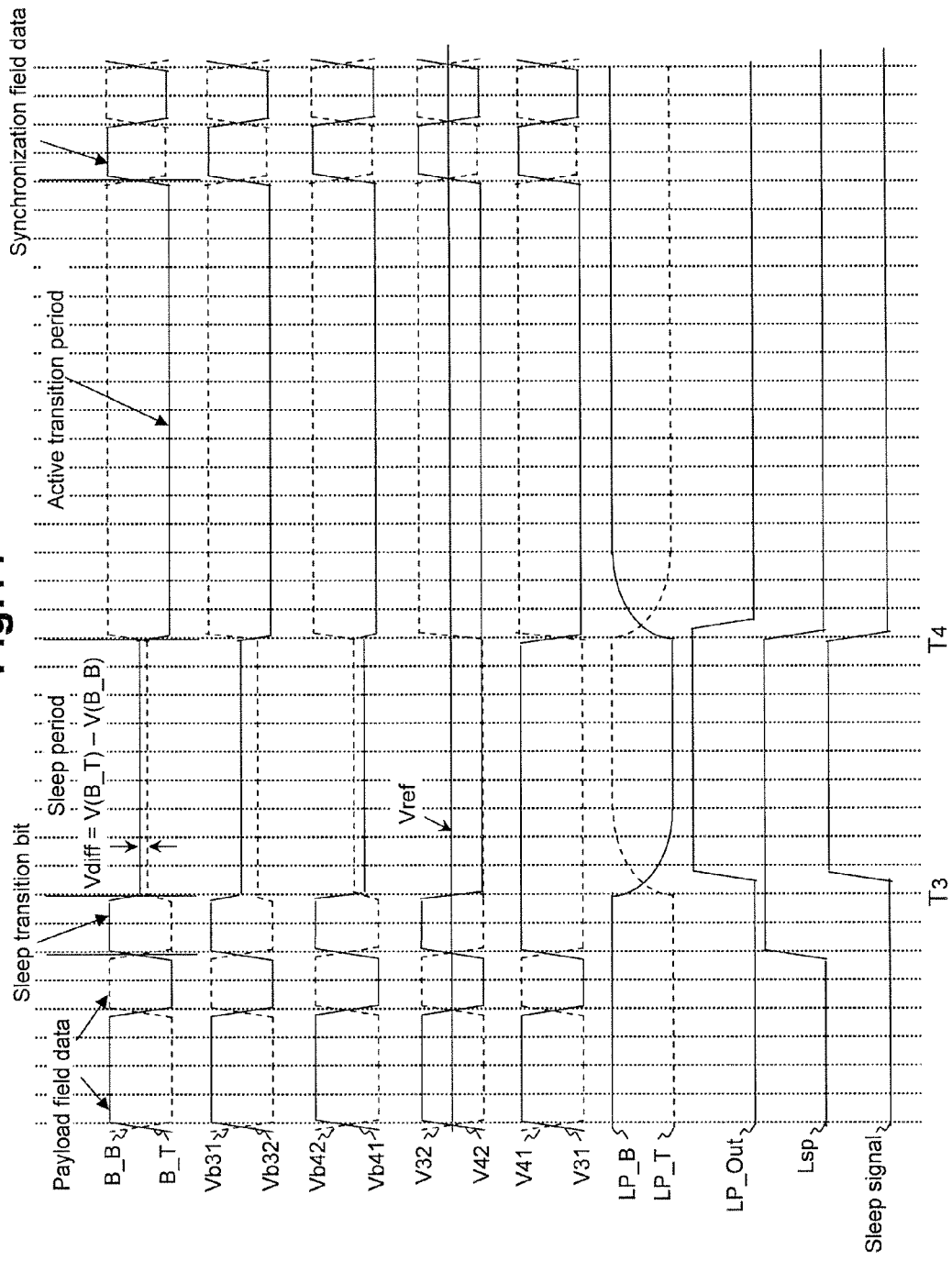
FIG. 11 is a chart indicating the signal waveform of each part of the hysteresis buffer amplifier illustrated in FIG. 10.

FIG. 11 indicates the signal waveform of each part of the hysteresis buffer amplifier 1 illustrated in FIG. 10.

Also in FIG. 11, the sleep period between time $T_3$ and time $T_4$ in the signal waveform chart is enlarged as in FIG. 9. As indicated in FIG. 11, a sleep transition bit is asserted a high level of "1" during the bit period immediately after the last bit of the payload data field of a frame. Therefore, the non-inverting input signal B_T and the inverting input signal B_B of the differential input signals B_T, B_B are respectively brought to high level and low level. In the latter-stage differential amplifier 45B, therefore, the base voltage Vb32 of the transistor Q32 and the base voltage Vb31 of the transistor Q31 are respectively brought to high level and low level; and the base voltage Vb41 of the transistor Q41 and the base voltage Vb42 of the transistor Q42 are respectively brought to high level and low level. Consequently, the collector voltage V32 of the transistor Q32 and the collector voltage V31 of the transistor Q31 are respectively brought to low level and high level; and the collector voltage V41 of the transistor Q41 and the collector voltage V42 of the transistor Q42 are respectively brought to low level and high level. As a result, the following difference voltage is latched by the transistors Q61, Q62 in the differential latch circuit during the sleep transition bit period immediately before the starting time $T_3$ of the sleep period: a difference voltage of the high level of the collector voltage V31 of the transistor Q31 and the low level of the collector voltage V41 of the transistor Q41 as the complementary output signals of the sleep transition bit determination circuit 45B1. As a result, the following can be implemented during the period from the sleep transition bit period immediately before the starting time $T_3$ of the sleep period to the ending time $T_4$: the difference voltage of the high level of the collector voltage V31 of the transistor Q31 and the low level of the collector voltage V41 of the transistor Q41 as the complementary output signals of the sleep transition bit determination circuit 45B1 can be maintained.

As mentioned above, the difference voltage of the collector voltages V31, V41 of the transistors Q31, Q41 is maintained for the long period from the sleep transition bit period immediately before the starting time $T_3$ of the sleep period to the ending time $T_4$. Since this difference voltage is supplied to the other low-pass filter 17 and the other differential amplifier 18, a sleep transition detection output signal Lsp is generated at the other differential amplifier 18 during the long period.

Meanwhile, the AND circuit 19 and the other low-pass filter 17 are coupled to the output of the differential amplifier 13 of the sleep detection circuit 47. It responds to the low level of the collector voltage V32 of the transistor Q32 during the sleep period of the latter-stage differential amplifier 45B and the low level of the collector voltage V42 of the transistor Q42. During the sleep period, therefore, the differential output signals LP_T, LP_B of the low-pass filter 12 are respectively brought to high level and low level; and a sleep detection output signal LP_Out from the output terminal of the differential amplifier 13 is also brought to high level. The sleep detection output signal LP_Out from the output terminal of the differential amplifier 13 of the sleep detection circuit 47 and the sleep transition detection output signal Lsp from the other differential amplifier 18 are inputted to the AND circuit 19. Therefore, a sleep signal of high level can be outputted from the output terminal of the AND circuit 19 during the sleep period.

<<Clock Selection Section>>

Figure 12:
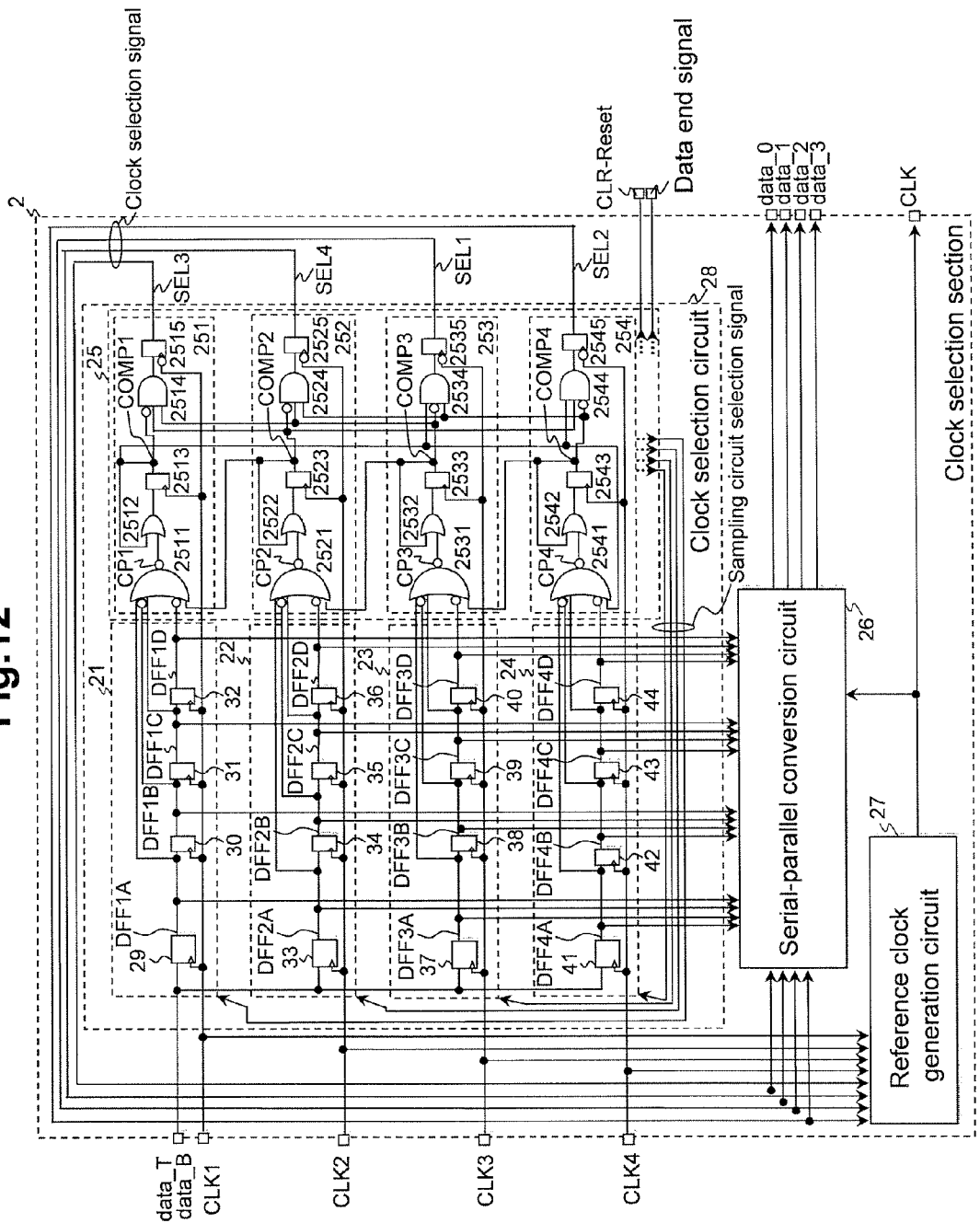
FIG. 12 is illustrates the configuration of a clock selection section of a data sampling unit in a semiconductor integrated circuit configured as a slave device in an embodiment of the invention illustrated in FIG. 1 to FIG. 4.

FIG. 12 illustrates the configuration of the clock selection section 2 in the data sampling unit 4 of a semiconductor integrated circuit configured as a slave device 9 in an embodiment of the invention illustrated in FIG. 1 to FIG. 4.

As illustrated in FIG. 12, the clock selection section 2 includes a clock selection circuit 28, a serial-parallel conversion circuit 26, and a reference clock generation circuit 27. Further, the clock selection circuit 28 includes multiple data sampling circuits 21, 22, 23, 24 and a clock selection data determination circuit 25.

The four data sampling circuits 21, 22, 23, 24 of the clock selection section 2 are respectively supplied with four clock signals CLK1, CLK2, CLK3, CLK4 different in phase, that is, whose phases are respectively 0 degrees, 90 degrees, 180 degrees, and 270 degrees. The frequency of these clock signals is set to 26 MHz for low-speed data communication and 312 MHz for high-speed data communication. Further, the four data sampling circuits 21, 22, 23, 24 of the clock selection section 2 are supplied with the complementary data data_T, data_B in the 16-bit synchronization field of a transmission frame in common. Especially, the first four bits "1010" of the data data_T in the 16-bit synchronization field are supplied to the four data sampling circuits 21, 22, 23, 24 of the clock selection section 2 in common. Therefore, the clock selection data determination circuit 25 of the clock selection section 2 is used to generate clock selection signals SEL1 to SEL4. The clock selection signals are for selecting as a reference clock signal CLK in an appropriate phase the following clock signal from among the four clock signals CLK1 to CLK4 different in phase: a clock signal having a rising edge in substantially the mid position in the pulse width of each bit of the four bits "1010." The clock selection signals SEL1 to SEL4 generated at the clock selection data determination circuit 25 are supplied to the reference clock generation circuit 27 and as a result, the reference clock signal CLK is generated at the reference clock generation circuit 27. The serial-parallel conversion circuit 26 is supplied with the reference clock signal CLK generated at the reference clock generation circuit 27 and data of the four data sampling circuits 21 to 24. Four bits of parallel data data_0, data_1, data_2, data_3 generated at the serial-parallel conversion circuit 26 are supplied to the synchronization/header/payload detection section 3.

Hereafter, detailed description will be given to the configuration and operation of the clock selection section 2.

The clock selection circuit 28 of the clock selection section 2 in FIG. 12 includes the four data sampling circuits 21, 22, 23, 24 and the clock selection data determination circuit 25.

The four data sampling circuits 21, 22, 23, 24 of the clock selection section 2 are respectively supplied with the four clock signals CLK1, CLK2, CLK3, CLK4 different in phase, that is, whose phases are respectively 0 degrees, 90 degrees, 180 degrees, and 270 degrees.

The first data sampling circuit 21 includes four flip-flops 29, 30, 31, 32 coupled in series and the trigger input terminals of the four flip-flops 29, 30, 31, 32 are supplied with the first clock signal CLK1 with a phase of 0 degrees in common. The data input terminal of the first flip-flop 29 is supplied with complementary data data_T, data_B in the 16-bit synchronization field of a transmission frame; and the data output terminal of the first flip-flop 29 is coupled to the data input terminal of the second flip-flop 30. The data output terminal of the second flip-flop 30 is coupled to the data input terminal of the third flip-flop 31 and the data output terminal of the third flip-flop 31 is coupled to the data input terminal of the fourth flip-flop 32. Four output signals from the four series-coupled flip-flops 29, 30, 31, 32 of the first data sampling circuit 21 are supplied to a first data determination circuit 251 in the clock selection data determination circuit 25. At the same time, they are also supplied to the serial-parallel conversion circuit 26.

The second data sampling circuit 22 also includes four flip-flops 33, 34, 35, 36 coupled in series and the trigger input terminals of the four flip-flops 33, 34, 35, 36 are supplied with the second clock signal CLK2 with a phase of 90 degrees in common. The data input terminal of the first flip-flop 33 is supplied with complementary data data_T, data_B in the 16-bit synchronization field of a transmission frame; and the data output terminal of the first flip-flop 33 is coupled to the data input terminal of the second flip-flop 34. The data output terminal of the second flip-flop 34 is coupled to the data input terminal of the third flip-flop 35 and the data output terminal of the third flip-flop 35 is coupled to the data input terminal of the fourth flip-flop 36. Four output signals from the four series-coupled flip-flops 33, 34, 35, 36 of the second data sampling circuit 22 are supplied to a second data determination circuit 252 in the clock selection data determination circuit 25. At the same time, they are also supplied to the serial-parallel conversion circuit 26.

The third data sampling circuit 23 also includes four flip-flops 37, 38, 39, 40 coupled in series and the trigger input terminals of the four flip-flops 37, 38, 39, 40 are supplied with the third clock signal CLK3 with a phase of 180 degrees in common. The data input terminal of the first flip-flop 37 is supplied with complementary data data_T, data_B in the 16-bit synchronization field of a transmission frame; and the data output terminal of the first flip-flop 37 is coupled to the data input terminal of the second flip-flop 38. The data output terminal of the second flip-flop 38 is coupled to the data input terminal of the third flip-flop 39 and the data output terminal of the third flip-flop 39 is coupled to the data input terminal of the fourth flip-flop 40. Four output signals of the four series-coupled flip-flops 37, 38, 39, 40 of the third data sampling circuit 23 are supplied to a third data determination circuit 253 in the clock selection data determination circuit 25. At the same time, they are also supplied to the serial-parallel conversion circuit 26.

The fourth data sampling circuit 24 also includes four flip-flops 41, 42, 43, 44 coupled in series and the trigger input terminals of the four flip-flops 41, 42, 43, 44 are supplied with the fourth clock signal CLK4 with a phase of 270 degrees in common. The data input terminal of the first flip-flop 41 is supplied with complementary data data_T, data_B in the 16-bit synchronization field of a transmission frame; and the data output terminal of the first flip-flop 41 is coupled to the data input terminal of the second flip-flop 42. The data output terminal of the second flip-flop 42 is coupled to the data input terminal of the third flip-flop 43 and the data output terminal of the third flip-flop 43 is coupled to the data input terminal of the fourth flip-flop 44. Four output signals from the four series-coupled flip-flops 41, 42, 43, 44 of the fourth data sampling circuit 24 are supplied to a fourth data determination circuit 254 in the clock selection data determination circuit 25. At the same time, they are also supplied to the serial-parallel conversion circuit 26.

The first data determination circuit 251 of the clock selection data determination circuit 25 includes: a NOR circuit 2511 in the first stage; an OR circuit 2512 in the second stage; a flip-flop 2513 in the third stage; an AND circuit 2514 in the fourth stage; and a flip-flop 2515 in the fifth stage. The NOR circuit 2511 in the first stage is supplied with: four output signals DFF1A to DFF1D of the series-coupled flip-flops 29, 30, 31, 32 of the first data sampling circuit 21; and an output signal of a flip-flop 2523 in the third stage of the second data determination circuit 252. The OR circuit 2512 in the second stage is supplied with an output signal CP1 of the NOR circuit 2511 in the first stage and an output signal of the flip-flop 2513 in the third stage. An output signal of the OR circuit 2512 in the second stage is supplied to the data input terminal of the flip-flop 2513 in the third stage. The AND circuit 2514 in the fourth stage is supplied with: an output signal of the flip-flop 2513 in the third stage; an output signal of the flip-flop 2523 in the third stage of the second data determination circuit 252; and an output signal of a flip-flop 2533 in the third stage of the third data determination circuit 253. An output signal of the AND circuit 2514 in the fourth stage is supplied to the data input terminal of the flip-flop 2515 in the fifth stage. The trigger input terminal of the flip-flop 2515 in the fifth stage is supplied with the inversion signal of the first clock signal CLK1 with a phase of 0 degrees. As a result, a third clock signal selection signal SEL3 for selecting the third clock signal CLK3 as reference clock signal CLK is outputted from the output terminal of the flip-flop 2515 in the fifth stage.

The second data determination circuit 252 of the clock selection data determination circuit 25 includes: a NOR circuit 2521 in the first stage; an OR circuit 2522 in the second stage; the flip-flop 2523 in the third stage; an AND circuit 2524 in the fourth stage; and a flip-flop 2525 in the fifth stage. The NOR circuit 2521 in the first stage is supplied with: four output signals DFF2A to DFF2D of the four series-coupled flip-flops 33, 34, 35, 36 of the second data sampling circuit 22; and an output signal of the flip-flop 2533 in the third stage of the third data determination circuit 253. The OR circuit 2522 in the second stage is supplied with an output signal CP2 of the NOR circuit 2521 in the first stage and an output signal of the flip-flop 2523 in the third stage. An output signal of the OR circuit 2522 in the second stage is supplied to the data input terminal of the flip-flop 2523 in the third stage. The AND circuit 2524 in the fourth stage is supplied with: an output signal of the flip-flop 2523 in the third stage; an output signal of the flip-flop 2533 in the third stage of the third data determination circuit 253; and an output signal of a flip-flop 2543 in the third stage of the fourth data determination circuit 254. An output signal of the AND circuit 2524 in the fourth stage is supplied to the data input terminal of the flip-flop 2525 in the fifth stage. The trigger input terminal of the flip-flop 2525 in the fifth stage is supplied with the inversion signal of the second clock signal CLK2 with a phase of 90 degrees. As a result, a fourth clock signal selection signal SEL4 for selecting the fourth clock signal CLK4 as reference clock signal CLK is outputted from the output terminal of the flip-flop 2525 in the fifth stage.

The third data determination circuit 253 of the clock selection data determination circuit 25 includes: a NOR circuit 2531 in the first stage; an OR circuit 2532 in the second stage; the flip-flop 2533 in the third stage; an AND circuit 2534 in the fourth stage; and a flip-flop 2535 in the fifth stage. The NOR circuit 2531 in the first stage is supplied with: four output signals DFF3A to DFF3D of the four series-coupled flip-flops 37, 38, 39, 40 of the third data sampling circuit 23; and an output signal of the flip-flop 2543 in the third stage of the fourth data determination circuit 254. The OR circuit 2532 in the second stage is supplied with an output signal CP3 of the NOR circuit 2531 in the first stage and an output signal of the flip-flop 2533 in the third stage. An output signal of the OR circuit 2532 in the second stage is supplied to the data input terminal of the flip-flop 2533 in the third stage. The AND circuit 2534 in the fourth stage is supplied with: an output signal of the flip-flop 2533 in the third stage; an output signal of the flip-flop 2543 in the third stage of the fourth data determination circuit 254; and an output signal of the flip-flop 2513 in the third stage of the first data determination circuit 251. An output signal of the AND circuit 2534 in the fourth stage is supplied to the data input terminal of the flip-flop 2535 in the fifth stage. The trigger input terminal of the flip-flop 2535 in the fifth stage is supplied with the inversion signal of the third clock signal CLK3 with a phase of 180 degrees. As a result, a first clock signal selection signal SEL1 for selecting the first clock signal CLK1 as reference clock signal CLK is outputted from the output terminal of the flip-flop 2535 in the fifth stage The fourth data determination circuit 254 of the clock selection data determination circuit 25 includes: a NOR circuit 2541 in the first stage; an OR circuit 2542 in the second stage; the flip-flop 2543 in the third stage; an AND circuit 2544 in the fourth stage; and a flip-flop 2545 in the fifth stage. The NOR circuit 2541 in the first stage is supplied with: four output signals DFF4A to DFF4D of the four series-coupled flip-flops 41, 42, 43, 44 of the fourth data sampling circuit 24; and an output signal of the flip-flop 2513 in the third stage of the first data determination circuit 251. The OR circuit 2542 in the second stage is supplied with an output signal CP4 of the NOR circuit 2541 in the first stage and an output signal of the flip-flop 2543 in the third stage. An output signal of the OR circuit 2542 in the second stage is supplied to the data input terminal of the flip-flop 2543 in the third stage. The AND circuit 2544 in the fourth stage is supplied with: an output signal of the flip-flop 2543 in the third stage; an output signal of the flip-flop 2513 in the third stage of the first data determination circuit 251; and an output signal of the flip-flop 2523 in the third stage of the second data determination circuit 252. An output signal of the AND circuit 2544 in the fourth stage is supplied to the data input terminal of the flip-flop 2545 in the fifth stage. The trigger input terminal of the flip-flop 2545 in the fifth stage is supplied with the inversion signal of the fourth clock signal CLK4 with a phase of 270 degrees. As a result, a second clock signal selection signal SEL2 for selecting the second clock signal CLK2 as reference clock signal CLK is outputted from the output terminal of the flip-flop 2545 in the fifth stage.

Figure 13:
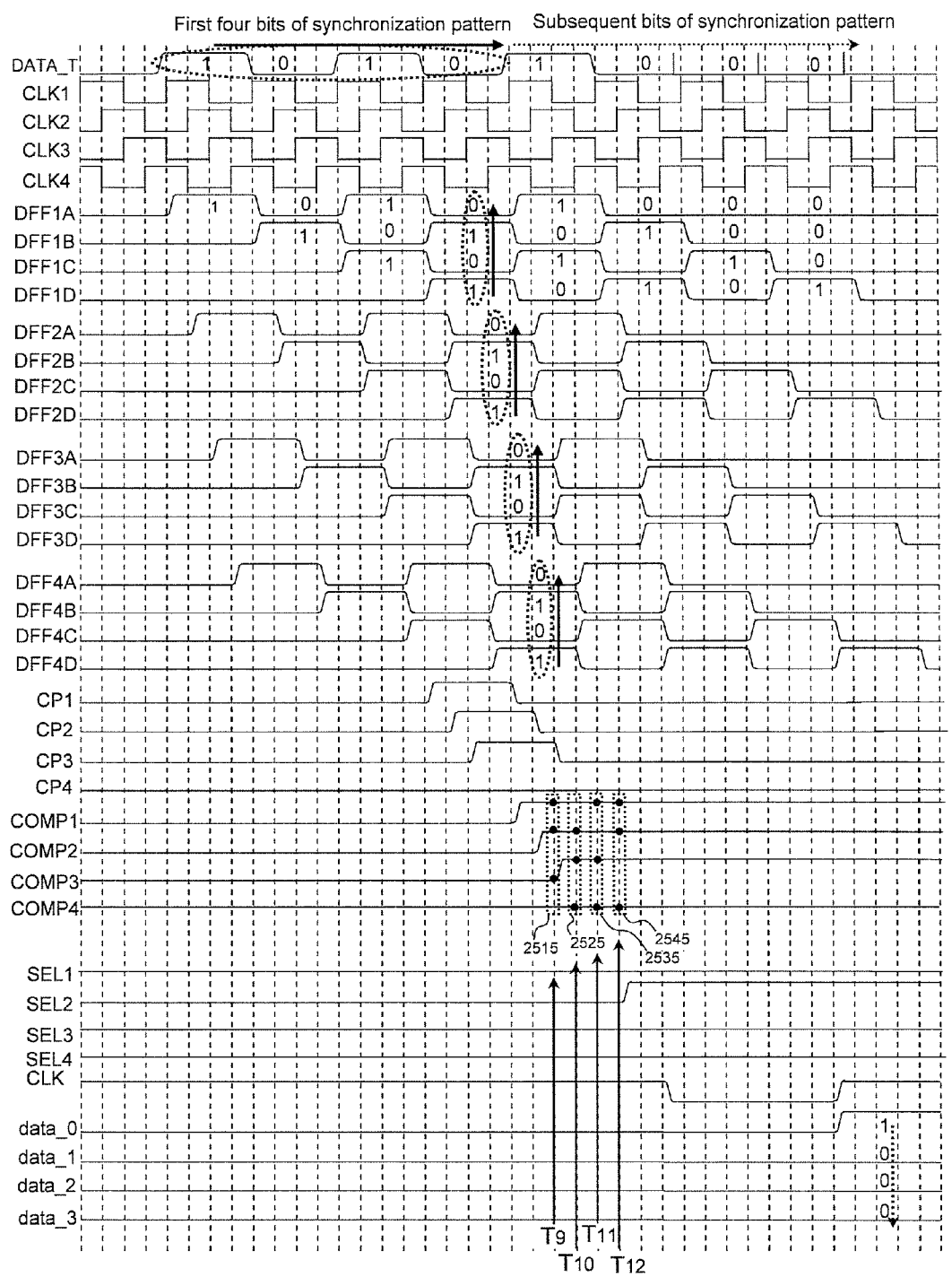
FIG. 13 is a chart indicating the signal waveform of each part of the clock selection section of the data sampling unit illustrated in FIG. 12.

FIG. 13 indicates the signal waveform of each part of the clock selection section 2 of the data sampling unit 4 illustrated in FIG. 12.

FIG. 13 indicates the following phases versus the phase of the first four bits "1010" of the data data_T in the 16-bit synchronization field: the phase of the first clock signal CLK1, the phase of the second clock signal CLK2, the phase of the third clock signal CLK3, and the phase of the fourth clock signal CLK4.

Further, FIG. 13 indicates the following waveforms: the waveforms of the four output signals DFF1A, DFF1B, DFF1C, DFF1D of the four series-coupled flip-flops of the first data determination circuit 251 in response to the phase of the first clock signal CLK1; the waveforms of the four output signals DFF2A, DFF2B, DFF2C, DFF2D of the four series-coupled flip-flops of the second data determination circuit 252 in response to the phase of the second clock signal CLK2; the waveforms of the four output signals DFF3A, DFF3B, DFF3C, DFF3D of the four series-coupled flip-flops of the third data determination circuit 253 in response to the phase of the third clock signal CLK3; and the waveforms of the four output signals DFF4A, DFF4B, DFF4C, DFF4D of the four series-coupled flip-flops of the fourth data determination circuit 254 in response to the phase of the fourth clock signal CLK4.

Furthermore, FIG. 13 indicates the waveform of the output signal CP1 of the NOR circuit 2511 in the first stage of the first data determination circuit 251 supplied with the following output signals: the four output signals DFF1A to DFF1D of the four series-coupled flip-flops 29, 30, 31, 32 of the first data sampling circuit 21 and the output signal of the flip-flop 2523 in the third stage of the second data determination circuit 252. The output signal CP1 of the NOR circuit 2511 in the first stage of the first data determination circuit 251 shifts from low level to high level in response to the following: the first four bits "1010" in the 16-bit synchronization field and a rising edge from low level to high level of the first clock signal CLK1. That is, since the NOR circuit 2511 in the first stage detects that all the input signals are zero at this time, the output signal CP1 of the NOR circuit 2511 in the first stage is brought to high level.

Similarly, FIG. 13 indicates that: the output signal CP2 of the NOR circuit 2521 in the first stage of the second data determination circuit 252 shifts from low level to high level in response to a rising edge from low level to high level of the second clock signal CLK2; and the output signal CP3 of the NOR circuit 2531 in the first stage of the third data determination circuit 253 similarly shifts from low level to high level in response to a rising edge from low level to high level of the third clock signal CLK3.

As indicated in FIG. 13, meanwhile, the output signal CP4 of the NOR circuit 2524 in the first stage of the fourth data determination circuit 254 is kept at low level in response to a rising edge from low level to high level of the fourth clock signal CLK2. It does not shift to high level. The reason for this is as follows: the NOR circuit 2541 in the first stage of the fourth data determination circuit 254 is supplied with an output signal of high level of the flip-flop 2513 in the third stage of the first data determination circuit 251; therefore, the NOR circuit 2541 in the first stage of the fourth data determination circuit 254 cannot detect that all the five input signals are zero.

The high level of the output signal CP1 of the NOR circuit 2511 in the first stage of the first data determination circuit 251 is latched to the flip-flop 2513 in the third stage in response to the following rising edge: a rising edge from low level to high level of the first clock signal CLK1. Therefore, the output signal COMP1 of the flip-flop 2513 in the third stage also shifts from low level to high level according to this timing. Similarly, the high level of the output signal CP2 of the NOR circuit 2521 in the first stage of the second data determination circuit 252 is latched to the flip-flop 2523 in the third stage in response to the following rising edge: a rising edge from low level to high level of the second clock signal CLK2. Therefore, the output signal COMP2 of the flip-flop 2523 in the third stage also shifts from low level to high level according to this timing. Similarly, the high level of the output signal CP3 of the NOR circuit 2531 in the first stage of the third data determination circuit 253 is latched to the flip-flop 2533 in the third stage in response to the following rising edge: a rising edge from low level to high level of the third clock signal CLK3. Therefore, the output signal COMP3 of the flip-flop 2533 in the third stage also shifts from low level to high level according to this timing. However, the output signal CP4 of the NOR circuit 2541 in the first stage of the fourth data determination circuit 254 kept at low level is also latched to the flip-flop 2543 in the third stage in response to the following rising edge: a rising edge from low level to high level of the fourth clock signal CLK4. As a result, the output signal COMP4 of the flip-flop 2543 in the third stage is also kept at low level.

The AND circuit 2514 in the fourth stage of the first data determination circuit 251 carries out decoding by AND signal processing on: the inversion signal of the output signal COMP1 of the flip-flop 2513 in the third stage; the output signal COMP2 of the flip-flop 2523 in the third stage of the second data determination circuit 252; and the output signal COMP3 of the flip-flop 2533 in the third stage of the third data determination circuit 253. The AND circuit 2524 in the fourth stage of the second data determination circuit 252 also carries out decoding by AND signal processing on: the inversion signal of the output signal COMP2 of the flip-flop 2523 in the third stage; the output signal COMP3 of the flip-flop 2533 in the third stage of the third data determination circuit 253; and the output signal COMP4 of the flip-flop 2543 in the third stage of the fourth data determination circuit 254. The AND circuit 2534 in the fourth stage of the third data determination circuit 253 also carries out decoding by AND signal processing on: the inversion signal of the output signal COMP3 of the flip-flop 2533 in the third stage; the output signal COMP4 of the flip-flop 2543 in the third stage of the fourth data determination circuit 254; and the output signal COMP1 of the flip-flop 2513 in the third stage of the first data determination circuit 251. The AND circuit 2544 in the fourth stage of the fourth data determination circuit 454 also carries out decoding by AND signal processing on: the inversion signal of the output signal COMP4 of the flip-flop 2543 in the third stage; the output signal COMP1 of the flip-flop 2513 in the third stage of the first data determination circuit 251; and the output signal COMP2 of the flip-flop 2523 in the third stage of the second data determination circuit 252.

At the first data determination circuit 251, the AND decode output of the AND circuit 2514 in the fourth stage with the output signals COMP1, COMP2, COMP3 is latched to the flip-flop 2515 in the fifth stage at time $T_9$ when the following takes place: the inversion signal of the first clock signal CLK1 supplied to the trigger input terminal of the flip-flop 2515 in the fifth stage of the first data determination circuit 251 shifts from low level to high level. At time $T_9$, the three filled circles for the output signals COMP1, COMP2, COMP3 are encircled with a broken line 2515. Further, the third clock signal selection signal SEL3 for selecting the third clock signal CLK3 as reference clock signal CLK is outputted from the output terminal of the flip-flop 2515 in the fifth stage.

At the second data determination circuit 252, in addition, the AND decode output of the AND circuit 2524 in the fourth stage with the output signals COMP2, COMP3, COMP4 is latched to the flip-flop 2525 in the fifth stage at time $T_{10}$ when the following takes place: the inversion signal of the second clock signal CLK2 supplied to the trigger input terminal of the flip-flop 2525 in the fifth stage of the second data determination circuit 252 shifts from low level to high level. At time $T_{10}$, the three filled circles for the output signals COMP2, COMP3, COMP4 are encircled with a broken line 2525. Further, the fourth clock signal selection signal SEL4 for selecting the fourth clock signal CLK4 as reference clock signal CLK is outputted from the output terminal of the flip-flop 2525 in the fifth stage.

At the third data determination circuit 253, further, the AND decode output of the AND circuit 2534 in the fourth stage with the output signals COMP1, COMP3, COMP4 is latched to the flip-flop 2535 in the fifth stage at time $T_{11}$ when the following takes place: the inversion signal of the third clock signal CLK3 supplied to the trigger input terminal of the flip-flop 2535 in the fifth stage of the third data determination circuit 253 shifts from low level to high level. At time $T_{11}$, the three filled circles for the output signals COMP1, COMP3, COMP4 are encircled with a broken line 2535. Further, the first clock signal selection signal SEL1 for selecting the first clock signal CLK1 as reference clock signal CLK is outputted from the output terminal of the flip-flop 2535 in the fifth stage.

At the fourth data determination circuit 254, furthermore, the AND decode output of the AND circuit 2444 in the fourth stage with the output signals COMP1, COMP2, COMP4 is latched to the flip-flop 2545 in the fifth stage at time $T_{12}$ when the following takes place: the inversion signal of the fourth clock signal CLK4 supplied to the trigger input terminal of the flip-flop 2545 in the fifth stage of the fourth data determination circuit 254 shifts from low level to high level. At time $T_{12}$, the three filled circles for the output signals COMP1, COMP2, COMP4 are encircled with a broken line 2545. Further, the second clock signal selection signal SEL2 for selecting the second clock signal CLK2 as reference clock signal CLK is outputted from the output terminal of the flip-flop 2545 in the fifth stage.

When the relation between the phase of the four bits "1010" and the phases of the four clock signals CLK1, CLK2, CLK3, CLK4 is as indicated in FIG. 13, the following takes place: the second clock signal selection signal SEL2 of high level for selecting the second clock signal CLK2 as reference clock signal CLK is outputted from the output terminal of the flip-flop 2545 in the fifth stage of the fourth data determination circuit 254. This is because at time $T_{12}$ corresponding to the broken line 2545, the following takes place: the output signal COMP1, output signal COMP2, and inversion output signal COMP4 as the three input signals to the AND circuit 2544 in the fourth stage of the fourth data determination circuit 254 are all at high level.

Therefore, the second clock signal selection signal SEL2 of high level generated at the clock selection data determination circuit 25 is supplied to the reference clock generation circuit 27. As a result, the reference clock generation circuit 27 selects the second clock signal CLK2 as reference clock signal CLK from among the four clock signals CLK1, CLK2, CLK3, CLK4.

Meanwhile, the serial-parallel conversion circuit 26 is coupled with the following output terminals: the output terminals of the four series-coupled flip-flops 29 to 32 in the first data sampling circuit 21; the output terminals of the four series-coupled flip-flops 33 to 36 in the second data sampling circuit 22; the output terminals of the four series-coupled flip-flops 37 to 40 in the third data sampling circuit 23; and the output terminals of the four series-coupled flip-flops 41 to 44 in the fourth data sampling circuit 24. Therefore, the serial-parallel conversion circuit 26 is supplied with the first four bits "1010" of the data data_T in four different types of 16-bit synchronization fields sampled by the four clock signals CLK1 to CLK4. Thereafter, it is also supplied with the subsequent bits "1000" in the four different types of synchronization patterns sampled by the four clock signals CLK1 to CLK4.

Therefore, when the second clock signal CLK2 is selected as reference clock signal CLK by the clock selection data determination circuit 25 and the reference clock generation circuit 27, the following takes place: in response to the second clock signal CLK2 selected as reference clock signal CLK, the serial-parallel conversion circuit 26 supplies the synchronization/header/payload detection section 3 with four bits of parallel data data_0, data_1, data_2, data_3 obtained by converting the subsequent bits "1000."

The second clock signal selection signal SEL2 of high level is for selecting the second clock signal CLK2 as reference clock signal CLK. When this signal is outputted from the output terminal of the fourth data determination circuit 254 of the clock selection data determination circuit 25, the following takes place: multiple sampling circuit selection signals generated at the clock selection data determination circuit 25 activate only the second data sampling circuit 22 among the data sampling circuits 21, 22, 23, 24 of the clock selection section 2; and meanwhile, they deactivate the other data sampling circuits 21, 23, 24. After the second clock signal CLK2 is selected as reference clock signal CLK as mentioned above, unwanted electricity consumption can be reduced in the clock selection section 2.

As described up to this point, the clock selection section 2 of the data sampling unit 4 can select an appropriate clock signal as reference clock signal CLK from among the four clock signals CLK1 to CLK4 using only the following: the first four bits "1010" of the synchronization pattern of a predetermined 16-bit code "1010100001001011" comprising the synchronization field contained in a frame of transmit data defined in the standard DigRF v3. As a result, the number of flip-flops 29 to 44 in the four data sampling circuits 21, 22, 23, 24 can be significantly reduced and it is possible to significantly reduce the power consumption and occupied area in chip of the clock selection section 2.

At the reference clock generation circuit 27, meanwhile, the reference clock signal CLK is generated by carrying out synchronization at a trailing edge based on the reference clock signal selected at the clock selection circuit 28 and thereby frequency-dividing it by two. At the lower part of FIG. 13 as well, the waveform of the reference clock signal CLK generated by frequency-dividing the second clock signal CLK2 selected as reference clock signal CLK by two at a trailing edge.

At the serial-parallel conversion circuit 26, therefore, the subsequent bits in the synchronization field, header field data, and payload field data are converted based on the reference clock signal CLK frequency-divided by two. Then four bits of parallel data data_0, data_1, data_2, data_3 are supplied to the synchronization/header/payload detection section 3.

Meanwhile, in the clock selection circuit 28 in the clock selection section 2 of the data sampling unit 4 illustrated in FIG. 12, the scale of the circuitry of the data sampling unit 4 can be reduced by taking the following measure: the four data sampling circuits 21, 22, 23, 24 are used both for the selection of a reference clock signal and for serial-parallel conversion. In addition, the following can be implemented by converting the input serial data data_T, data_B into the four bits of parallel data data_0, data_1, data_2, data_3: it is possible to reduce the frequency of data sampling clock signals at the synchronization/header/payload detection section 3 as the subsequent circuit and this facilitates circuit designing.

Figure 14:
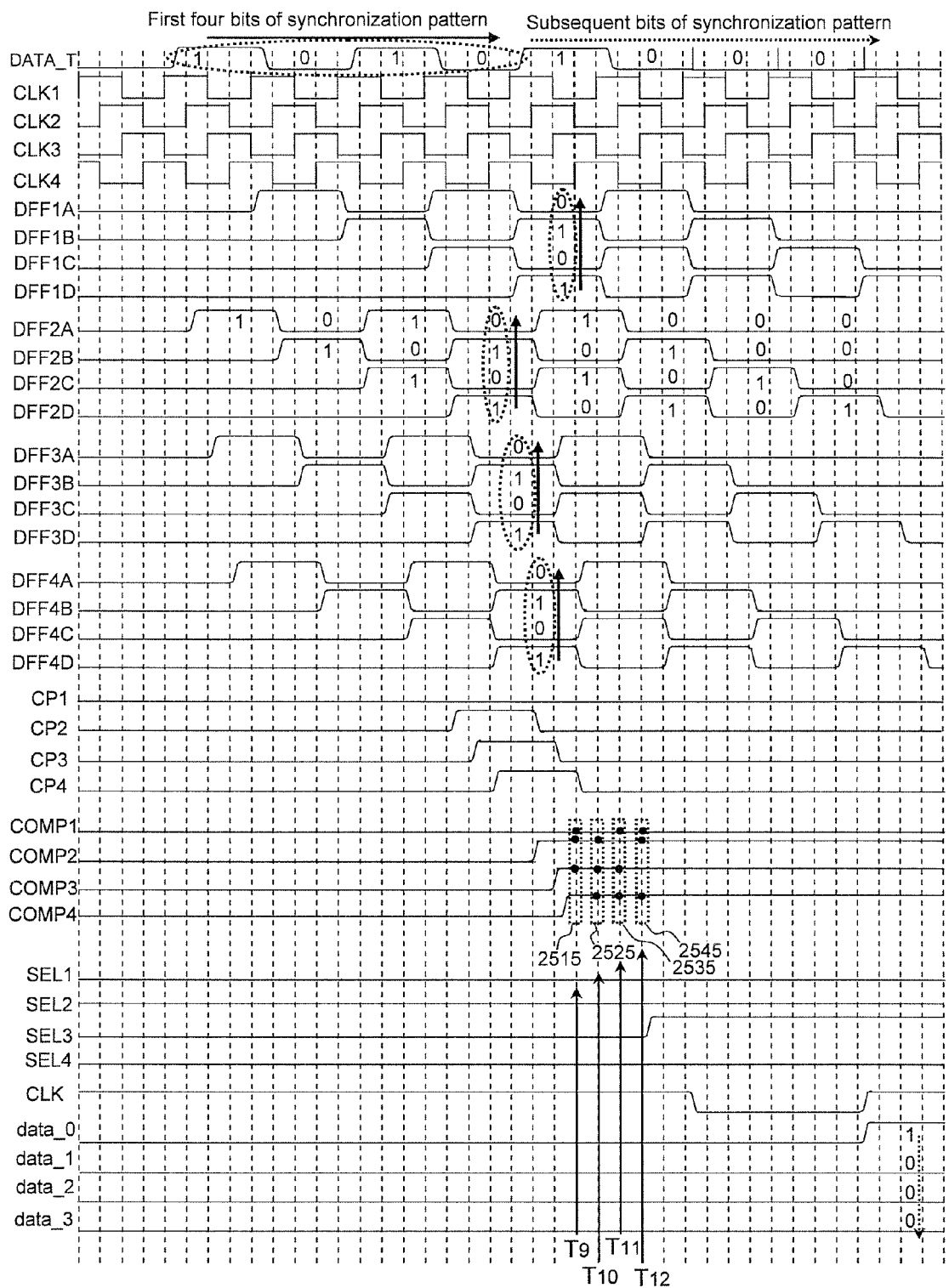
FIG. 14 is a chart indicating the signal waveform of each part of the clock selection section of the data sampling unit in FIG. 12, observed when the first four bits "1010" in a 16-bit synchronization field are slightly delayed relative to four clock signals as compared with the signal waveform chart shown in FIG. 13.

FIG. 14 indicates the signal waveform of each part of the clock selection section 2 of the data sampling unit 4 in FIG. 12. In this chart, the phase of the first four bits "1010" in the 16-bit synchronization field is slightly delayed relative to the four clock signals CLK1, CLK2, CLK3, CLK4 as compared with the signal waveform chart in FIG. 13.

In case of the example in FIG. 14, the phase of the first four bits "1010" is slightly delayed; therefore, the second data determination circuit 252 that responds to the second clock signal CLK2 first detects the first four bits "1010." More specific description will be given. The output signal CP2 of the NOR circuit 2521 in the first stage of the second data determination circuit 252 shifts from low level to high level in response to the following: the first four bits "1010" in the 16-bit synchronization field and a rising edge from low level to high level of the second clock signal CLK2. At this time, the NOR circuit 2521 in the first stage detects that all the five input signals are zero and thus the output signal CP2 of the NOR circuit 2521 in the first stage is brought to high level. Thereafter, the following output signals transition from low level to high level one after another: the output signal CP3 of the NOR circuit 2531 in the first stage of the third data determination circuit 253 and the output signal CP4 of the NOR circuit 2541 in the first stage of the fourth data determination circuit 243. However, the output signal CP1 of the NOR circuit 2511 in the first stage of the first data determination circuit 251 is kept at low level and it does not shift to high level. The reason for this is as follows: the NOR circuit 2511 in the first stage of the first data determination circuit 251 is supplied with the output signal of high level of the flip-flop 2523 in the third stage of the first data determination circuit 252; therefore, the NOR circuit 2511 in the first stage of the first data determination circuit 251 cannot detect that all the five input signals are zero.

When the relation between the phase of the four bits "1010" and the phases of the four clock signals CLK1, CLK2, CLK3, CLK4 is as indicated in FIG. 14, the following takes place: the third clock signal selection signal SEL3 of high level for selecting the third clock signal CLK3 as reference clock signal CLK is outputted from the output terminal of the flip-flop 2545 in the fifth stage of the fourth data determination circuit 254. This is because at time $T_9$ corresponding to the broken line 2515, the following takes place: the inversion output signal COMP1, output signal COMP2, and output signal COMP3 as the three input signals to the AND circuit 2514 in the fourth stage of the first data determination circuit 251 are all at high level.

Therefore, the third clock signal selection signal SEL3 of high level generated at the clock selection data determination circuit 25 is supplied to the reference clock generation circuit 27. As a result, the reference clock generation circuit 27 selects the third clock signal CLK3 as reference clock signal CLK from among the four clock signals CLK1, CLK2, CLK3, CLK4.

As described up to this point, the following can be implemented by using the clock selection section 2 of the data sampling unit 4 illustrated in FIG. 12: a clock signal having a phase appropriate for the timing of the phase of the first four bits "1010" in the 16-bit synchronization field can be selected as reference clock signal CLK from among the four clock signals CLK1, CLK2, CLK3, CLK4.

<<Synchronization/Header/Payload Detection Section>>

The four bits of parallel data data_0, data_1, data_2, data_3 converted at the serial-parallel conversion circuit 26 of the clock selection section 2 in FIG. 12 are supplied together with the reference clock signal CLK to the synchronization/header/payload detection section 3 as illustrated in FIG. 4. At the synchronization/header/payload detection section 3, first, accurate synchronization determination is carried out to determine whether or not the remaining 12 bits "100001001011" of the 16 bits comprising the synchronization field have been normally transferred.

When the remaining 12 bits of the 16 bits comprising the synchronization field have not been normally transferred, a clock reset signal CLK_reset is outputted from the synchronization/header/payload detection section 3. The clock reset signal CLK_reset is supplied to the clock selection section 2. The clock selection section 2 initializes information in it and carries out again the processing of synchronization determination by the first four bits of the 16 bits comprising the synchronization field and the section of a reference clock signal.

When the remaining 12 bits of the 16 bits comprising the synchronization field have been normally transferred, the synchronization/header/payload detection section 3 first carries out the operation of reading data in the header field. The payload field has seven different data sizes, 8 bits, 32 bits, 64 bits, 96 bits, 128 bits, 256 bits, and 512 bits. When storage of all the payload data in a predetermined data size contained in the payload field in the data memory section 71 is completed, the synchronization/header/payload detection section 3 generates a data end signal. This data end signal is supplied to the clock selection section 2 and the sleep determination section 6. When the data end signal is supplied, at the clock selection section 2, information of synchronization determination, the selection of a reference clock signal, and the like in the clock selection section 2 is initialized.

<<Sleep Determination Section>>

As already described, the sleep determination section 6 of the LVDS interface 5 illustrated in FIG. 4 generates a sleep transition signal in response to a sleep signal from the hysteresis buffer amplifier 1 and a data end signal from the synchronization/header/payload detection section 3. This sleep transition signal is supplied to the clock selection section 2, synchronization/header/payload detection section 3, and data memory section 71 and these circuits are brought into sleep mode and put into a low-power consumption state. Sleep mode in the clock selection section 2, synchronization/header/payload detection section 3, and data memory section 71 can be achieved by, for example, interrupting internal power supply voltage supplied to these circuits.

<<Operation Sequence of LVDS Interface>>

Figure 15:
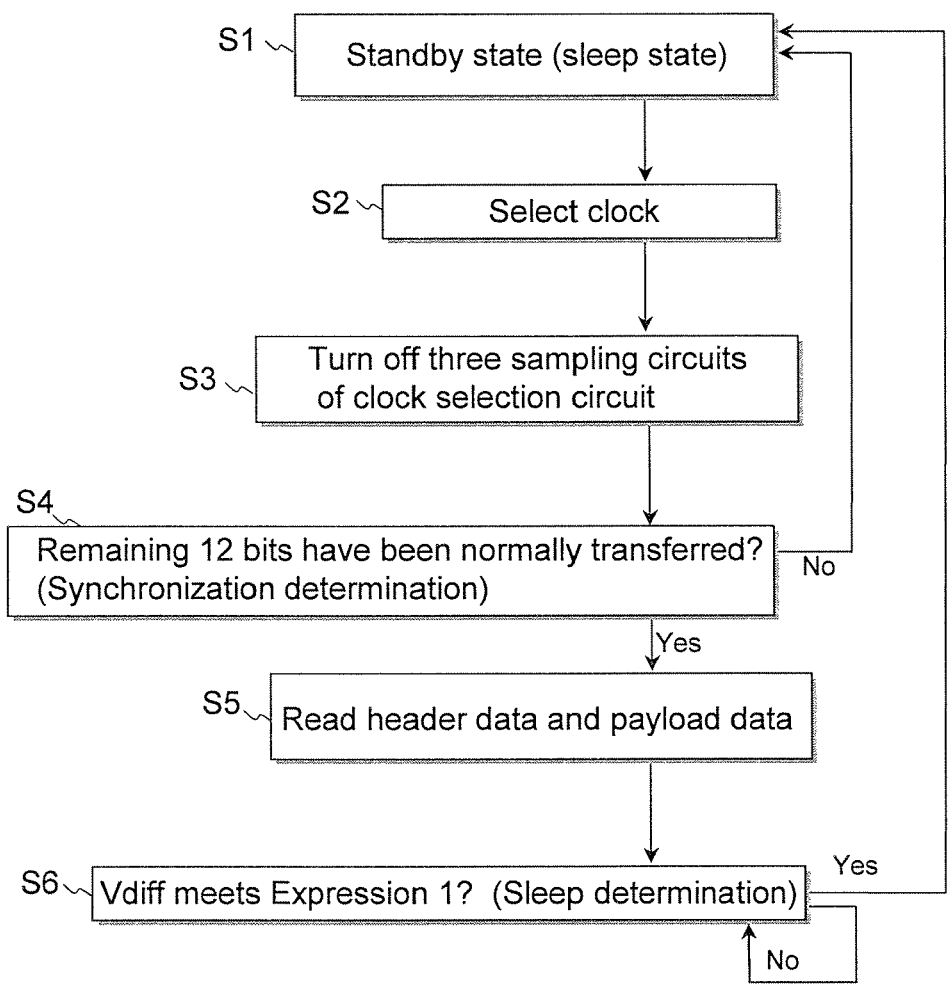
FIG. 15 is a chart illustrating the operation sequence of an LVDS interface of a semiconductor integrated circuit configured as a slave device in various embodiments of the invention illustrated in FIG. 1 to FIG. 14.

FIG. 15 illustrates the operation sequence of the LVDS interface 5 of a semiconductor integrated circuit configured as a slave device 9 in various embodiments of the invention described with reference to FIG. 1 to FIG. 14.

In the standby state at Step S1, a digital transmit baseband signal in compliance with the standard DigRF v3 is inputted to the LVDS interface 5. The standby state is equivalent to sleep mode. To proceed to the next step, Step S2, therefore, the master device supplies an active transition bit of low level during at least the following period: a period of eight bits (for high-speed clock) or a period of one bit (for low-speed or medium-speed clock) before the start of the first bit of the synchronization sequence for a new frame.

Then the LVDS interface 5 of the slave device 9 shifts from sleep mode to active mode and carries out the clock selection processing of Step S2. In the clock selection processing of Step S2, the above-mentioned processing is carried out. That is, a clock signal having a phase appropriate for the timing of the phase of the first four bits "1010" in the 16-bit synchronization field is selected as reference clock signal CLK from among the four clock signals CLK1, CLK2, CLK3, CLK4.

When the clock selection processing of Step S2 is completed, the operation of the interface 5 proceeds to Step S3. At Step S3, the above-mentioned processing is carried out. That is, of the four data sampling circuits 21, 22, 23, 24 of the clock selection section 2, only one for generating the clock selected as reference clock signal CLK is activated. The other three unnecessary data sampling circuits are deactivated by interruption. The unwanted electricity consumption in the clock selection section 2 is thereby reduced.

When the processing for reducing the power consumption of the clock selection section of Step S3 is completed, the operation of the interface 5 proceeds to Step S4. At Step S4, the above-mentioned processing is carried out. That is, the synchronization/header/payload detection section 3 carries out accurate synchronization determination to determine whether or not the remaining 12 bits "100001001011" of the 16 bits comprising the synchronization field have been normally transferred.

When it is determined at Step S4 that the remaining 12 bits have not been normally transferred, a clock reset signal CLK_reset is outputted from the synchronization/header/payload detection section 3 and the information in the clock selection section 2 is initialized. At the same time, the operation is returned to Step S1 to carry out again the processing of synchronization determination by the first four bits of the 16 bits comprising the synchronization field and the selection of a reference clock signal.

When it is determined at Step S4 that the remaining 12 bits have been normally transferred, the operation of the interface 5 proceeds to Step S5. At Step S5, the synchronization/header/payload detection section 3 reads data in the header field and data in the payload field as mentioned above. The payload field has seven different data sizes, 8 bits, 32 bits, 64 bits, 96 bits, 128 bits, 256 bits, and 512 bits. When storage of all the payload data in a predetermined data size contained in the payload field in the data memory section 71 is completed, the synchronization/header/payload detection section 3 generates a data end signal. Then the operation of the interface 5 proceeds to Step S6.

At Step S6, sleep determination is carried out by the hysteresis buffer amplifier 1 of the interface 5. That is, the hysteresis buffer amplifier 1 determines whether or not the differential amplitude voltage Vdiff of the differential input signals B_T, B_B of the hysteresis buffer amplifier 1 meets Expression 1 above as mentioned above.

When the differential amplitude voltage Vdiff meets Expression 1 above, the operation of the interface 5 shifts to the standby state (sleep mode) of Step S1. When the differential amplitude voltage Vdiff does not meet Expression 1 above, the operation of the interface 5 returns to the sleep determination processing of Step S6.

Up to this point, concrete description has been given to the invention made by the present inventors based on embodiments of the invention. However, the invention is not limited to the above embodiments and can be variously modified without departing from its subject matter, needless to add.

Some examples will be taken. The two differential amplifiers A1, A2 of the former-stage differential amplifier 45A in the hysteresis circuit 45 of the hysteresis buffer amplifier 1 in FIG. 6 are provided with an offset characteristic by the source resistors R1, R2. The invention is not limited to this configuration. As methods other than the method of using source resistors, the threshold voltages of paired MOS transistors of the transistor pair Q11, Q12 and the transistor pair Q21, Q22 may be brought out of balance or the conductances of the paired MOS transistors may be brought out of balance.

The LVDS interface as a digital interface of high-speed, low-amplitude differential signals of the invention is not limited to RFIC supplied with differential digital baseband signals from a baseband LSI. It can be adopted in a wide variety of slave devices as system LSIs used in many applications in which a high-speed, low-amplitude differential output signal outputted from a master device is supplied and control is carried out to establish sleep mode.

What is claimed is:

1. A semiconductor integrated circuit comprising:
an input interface externally supplied with an input signal; and
an internal core circuit supplied with signal data generated at the input interface as the result of reception of the input signal by the input interface,
wherein the input interface comprises a hysteresis circuit and a data sampling unit,
wherein the hysteresis circuit of the input interface has a first input threshold and a second input threshold and thus the hysteresis circuit detects as a sleep command the input signal having a predetermined voltage range between the first input threshold and the second input threshold,
wherein the data sampling unit of the input interface selects a phase of a sampling clock signal appropriate to sample data according to the data pattern of a synchronizing signal supplied as the input signal and the data sampling unit uses a sampling clock signal having the selected phase to sample payload data contained in the input signal,
wherein when the hysteresis circuit of the input interface detects the sleep command, a sleep signal generated at the hysteresis circuit is supplied to the internal core circuit and the internal core circuit is controlled into sleep mode in response to the sleep signal,
wherein the sleep signal generated at the hysteresis circuit is also supplied to the data sampling unit of the input interface and as a result the data sampling unit is controlled into sleep mode in response to the sleep signal, wherein the data sampling unit comprises a plurality of data sampling circuits and a clock selection data determination circuit, wherein the data sampling circuits sample the data pattern of the synchronizing signal in parallel by a plurality of clock signals different in phase from one another, wherein the clock selection data determination circuit generates a plurality of clock signal selection signals in response to a plurality of output signals outputted from the data sampling circuits and thereby selects one clock signal as reference clock signal from among the clock signals to generate the sampling clock signal used for sampling the payload data, wherein after selection of the reference clock signal, one data sampling circuit for generating the selected one clock signal is activated among the data sampling circuits and the other data sampling circuits for generating other unselected clock signals are deactivated, wherein the data sampling unit stores into a memory the payload data sampled by the sampling clock, wherein the data sampling unit generates a data end signal in response to the completion of storage of the payload data into the memory, wherein the input interface further comprises a sleep determination circuit that is supplied with the sleep signal generated at the hysteresis circuit and the data end signal generated at the data sampling unit and thereby generates a sleep transition signal, wherein the sleep determination circuit asserts the sleep transition signal in response to both the sleep signal and the data end signal being asserted, wherein the internal core circuit and the data sampling unit are controlled into the sleep mode in response to the sleep transition signal asserted by the sleep determination circuit, and wherein the input interface is configured as a differential signal interface supplied with a differential input signal as the input signal.

2. The semiconductor integrated circuit according to claim 1, wherein the data sampling unit generates the data end signal based on the data size information of a header contained in the input signal.

3. The semiconductor integrated circuit according to claim 1, wherein the hysteresis circuit of the input interface is coupled with a sleep transition bit determination circuit, and wherein the sleep transition bit determination circuit determines the level of a sleep transition bit during a bit period immediately after the last bit of the payload data.

4. The semiconductor integrated circuit according to claim 1, wherein the hysteresis circuit of the input interface comprises a plurality of differential amplifiers responding to the differential input signal as the input signal and a sleep detection circuit responding to a differential output signal of at least one differential amplifier of the differential amplifiers, and wherein the hysteresis circuit of the input interface thereby operates as a window comparator that detects as the sleep command the input signal having the predetermined voltage range between the first input threshold and the second input threshold.

5. The semiconductor integrated circuit according to claim 1, wherein the input interface configured as the differential signal interface is a digital interface and the digital interface is supplied with a differential digital baseband signal, wherein the differential digital baseband signal is converted into a large-amplitude digital baseband signal having an amplitude signal larger than the differential amplitude of the differential digital baseband signal by the hysteresis circuit and the data sampling unit of the input interface, wherein the internal core circuit comprises a D-A converter for transmission and an up conversion transmission circuit, wherein the large-amplitude digital baseband signal from the input interface can be converted into an analog transmit baseband signal by the D-A converter for transmission, and wherein the analog transmit baseband signal from the D-A converter for transmission can be converted into an RF transmission signal by the up conversion transmission circuit.

6. The semiconductor integrated circuit according to claim 5, wherein the data sampling unit uses the sampling clock signal to carry out serial-parallel conversion of the input signal.

7. An operation method for a semiconductor integrated circuit comprising:

receiving an externally supplied input signal via an input interface; and supplying an internal core circuit with signal data generated at the input interface as a result of reception of the input signal by the input interface, wherein the input interface comprises a hysteresis circuit and a data sampling unit, wherein the hysteresis circuit of the input interface has a first input threshold and a second input threshold and thus the hysteresis circuit detects as a sleep command the input signal having a predetermined voltage range between the first input threshold and the second input threshold, wherein the data sampling unit of the input interface selects a phase of a sampling clock signal appropriate to sample data according to the data pattern of a synchronizing signal supplied as the input signal and the data sampling unit uses a sampling clock signal having the selected phase to sample payload data contained in the input signal, wherein when the hysteresis circuit of the input interface detects the sleep command, a sleep signal generated at the hysteresis circuit is supplied to the internal core circuit and the internal core circuit is controlled into sleep mode in response to the sleep signal, wherein the sleep signal generated at the hysteresis circuit is also supplied to the data sampling unit of the input interface and as a result the data sampling unit is controlled into sleep mode in response to the sleep signal, wherein the data sampling unit comprises a plurality of data sampling circuits and a clock selection data determination circuit, wherein the data sampling circuits sample the data pattern of the synchronizing signal in parallel by a plurality of clock signals different in phase from one another, wherein the clock selection data determination circuit generates a plurality of clock signal selection signals in response to a plurality of output signals outputted from the data sampling circuits and thereby selects one clock signal as reference clock signal from among the clock signals to generate the sampling clock signal used for sampling the payload data, wherein after selection of the reference clock signal, one data sampling circuit for generating the selected one clock signal is activated among the data sampling circuits and the other data sampling circuits for generating other unselected clock signals are deactivated, wherein the data sampling unit stores into a memory the payload data sampled by the sampling clock, wherein the data sampling unit generates a data end signal in response to the completion of storage of the payload data into the memory, wherein the input interface further comprises a sleep determination circuit that is supplied with the sleep signal generated at the hysteresis circuit and the data end signal generated at the data sampling unit and thereby generates a sleep transition signal, wherein the sleep determination circuit asserts the sleep transition signal in response to both the sleep signal and the data end signal being asserted, wherein the internal core circuit and the data sampling unit are controlled into the sleep mode in response to the sleep transition signal asserted by the sleep determination circuit, and wherein the input interface is configured as a differential signal interface supplied with a differential input signal as the input signal.

8. The operation method for the semiconductor integrated circuit according to claim 7, wherein the data sampling unit generates the data end signal based on the data size information of a header contained in the input signal.

9. The operation method for the semiconductor integrated circuit according to claim 7, wherein the hysteresis circuit of the input interface is coupled with a sleep transition bit determination circuit, and wherein the sleep transition bit determination circuit determines the level of a sleep transition bit during a bit period immediately after the last bit of the payload data.

10. The operation method for the semiconductor integrated circuit according to claim 7, wherein the hysteresis circuit of the input interface comprises a plurality of differential amplifiers responding to the differential input signal as the input signal and a sleep detection circuit responding to a differential output signal of at least one differential amplifier of the differential amplifiers, and wherein the hysteresis circuit of the input interface operates as a window comparator that detects as the sleep command the input signal having the predetermined voltage range between the first input threshold and the second input threshold.

11. The operation method for the semiconductor integrated circuit according to claim 7, wherein the input interface configured as the differential signal interface is a digital interface and the digital interface is supplied with a differential digital baseband signal, wherein the differential digital baseband signal is converted into a large-amplitude digital baseband signal having an amplitude signal larger than the differential amplitude of the differential digital baseband signal by the hysteresis circuit and the data sampling unit of the input interface, wherein the internal core circuit comprises a D-A converter for transmission and an up conversion transmission circuit, wherein the large-amplitude digital baseband signal from the input interface can be converted into an analog transmit baseband signal by the D-A converter for transmission, and wherein the analog transmit baseband signal from the D-A converter for transmission can be converted into an RF transmission signal by the up conversion transmission circuit.

12. The operation method for the semiconductor integrated circuit according to claim 11, wherein the data sampling unit uses the sampling clock signal to carry out serial-parallel conversion of the input signal.

\* \* \* \* \*